(12) United States Patent
Takashima et al.

(10) Patent No.: US 6,504,551 B1
(45) Date of Patent: Jan. 7, 2003

(54) COLOR CORRECTION DEVICE, COLOR CORRECTION METHOD, PICTURE PROCESSING DEVICE, AND PICTURE PROCESSING METHOD

(75) Inventors: Akihiro Takashima, Kanagawa; Katsuakira Moriwake, Tokyo; Shoichi Usui, Kanagawa, all of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/180,513

(22) PCT Filed: Mar. 16, 1998

(86) PCT No.: PCT/JP98/01102

§ 371 (c)(1),
(2), (4) Date: May 4, 1999

(87) PCT Pub. No.: WO98/42142

PCT Pub. Date: Sep. 24, 1998

(30) Foreign Application Priority Data

Mar. 14, 1997 (JP) .............................................. 9-082252
Jul. 4, 1997 (JP) ............................................. 9-195039

(51) Int. Cl.[7] ............................ G09G 5/00; G09G 5/02; H04N 11/06; G06K 9/00; G03F 3/08
(52) U.S. Cl. ...................... 345/649; 345/590; 345/591; 345/600; 348/488; 348/583; 348/603; 358/518; 358/520; 382/162; 382/167
(58) Field of Search ................................ 345/600, 589, 345/590, 591, 593, 597, 601, 602, 604, 547, 549, 722; 382/162, 167, 166, 232; 358/518, 520, 504; 348/488, 496–498, 502, 514, 517, 519, 520, 527, 539, 557, 560, 562, 571, 582, 597, 599, 603, 712, 583

(56) References Cited

U.S. PATENT DOCUMENTS

| | | | |
|---|---|---|---|
| 5,416,890 A | * 5/1995 | Beretta | 345/590 |
| H1506 | * 12/1995 | Beretta | 345/591 |
| 5,721,628 A | * 2/1998 | Takaragi | 358/518 |
| 5,909,291 A | * 6/1999 | Myers et al. | 358/523 |
| 5,963,201 A | * 10/1999 | McGreggor | 345/722 |
| 6,072,902 A | * 6/2000 | Myers | 382/167 |
| 6,128,407 A | * 10/2000 | Inoue | 382/167 |

FOREIGN PATENT DOCUMENTS

| | | | | |
|---|---|---|---|---|
| EP | 000920223 A1 | * 6/1999 | | H04N/9/74 |
| JP | 62-281066 | 12/1987 | | |
| JP | 40116157 | * 6/1989 | | G06F/15/62 |
| JP | 2-309887 | 12/1990 | | |
| JP | 4-211570 | 8/1992 | | |
| JP | 4-321182 | 11/1992 | | |
| JP | 5-119752 | 5/1993 | | |
| JP | 6-121338 | 4/1994 | | |
| JP | 7-67131 | 3/1995 | | |
| JP | 7-131807 | 5/1995 | | |
| JP | 408065534 | * 3/1996 | | H04N/1/52 |
| JP | 8-191400 | 7/1996 | | |
| JP | 9-186907 | 7/1997 | | |
| JP | 9-214792 | 8/1997 | | |
| JP | 9-258706 | 10/1997 | | |
| JP | 410285459 | * 10/1998 | | H04N/5/262 |

* cited by examiner

*Primary Examiner*—Matthew Luu
*Assistant Examiner*—Wesner Sajous
(74) *Attorney, Agent, or Firm*—Frommer Lawrence & Haug LLP; William S. Frommer; Glenn F. Savit

(57) ABSTRACT

The color of plural pixels making up a source video image is corrected by a computer 10, a hard disc device 20 and a picture processing device 30. The computer 10 functions as a parameter setting unit for setting plural parameters for designating the source color and the destination color and a computing unit for computing correction data for color correction from the source color to the destination color using the plural parameters set by the parameter setting unit. The hard disc device 20 stores the source video image and effects color correction in the picture processing device 30 for correcting the color of a pixel corresponding to the source color contained in the source video image to the destination color.

27 Claims, 29 Drawing Sheets

(8 of 29 Drawing Sheet(s) Filed in Color)

COLOR CORRECTION DEVICE, COLOR CORRECTION METHOD, PICTURE PROCESSING DEVICE, AND PICTURE PROCESSING METHOD

TECHNICAL FIELD

This invention relates to a color correction method and apparatus and picture processing method and apparatus used on the site of editing picture material.

BACKGROUND ART

On the editing site for picture material, such as a broadcasting station, the color temperature or color tone is adjusted by correcting the signal level of picture signals using a color correction device comprised of a picture processing device.

The color correction device is configured for performing primary processing and secondary processing. The primary processing corrects the signal level of the picture signals, mainly the luminance level, such as white level, black level or gamma correction. The secondary processing corrects the signal level of picture signals, mainly the color vector.

On the editing site, the above processing corrects fluctuations of the color temperature among editing materials recorded on different date and time. Thus, on the editing site, the processing characteristics are set on repeated previewing, as the processing results are checked, so that fluctuations among materials are substantially indiscernible.

The color correction device is of the hardware structure with the use of a gate array or of the software structure by computational processing. On the broadcasting site, an apparatus by the hardware configuration is mainly used.

Meanwhile, in the conventional color correction device, the colors that can be set as processing objects (comprised of the source vector and generally comprised of six colors of red, green, blue, yellow, cyan and magenta) and the number thereof are limited such that fine adjustment of the color hue is correspondingly limited. Moreover, adjustment of characteristics, such as the range or degree for correction, is limited for these source vectors.

Thus, the conventional color correction device has a drawback that processing cannot be executed with high degree of freedom.

As a method for resolving this drawback, it may be contemplated to correct the signal level of the picture signals by the hardware configuration employing a lookup table and to vary the contents of the lookup table by operator setting. That is, if the signal level of the picture signals is corrected by the lookup table, the desired color can be set to the source vector, while the number of source vectors or the range of correction can be set to various values, thus enabling execution of processing to a high degree of freedom.

However, if the processing of high degree of freedom can be executed, it becomes correspondingly difficult for the operator to grasp correctly the degree of processing thus complicating the operation.

DISCLOSURE OF THE INVENTION

It is therefore an object of the present invention to provide a picture processing method and apparatus whereby processing to a high degree of freedom can be executed by a simplified operation.

It is another object of the present invention to provide a color correction method and apparatus whereby color correction can be made on designation of the color hue range.

It is yet another object of the present invention to provide a color correction method and apparatus whereby color correction can be made on designation of plural color hues.

The present invention provides a color correction device for correcting the color of plural pixels making up a source video image including parameter setting means for setting plural parameters for designating the source color and the destination color and computing means for computing correction data for color correction of the source color to the destination color, using plural parameters as set by the parameter setting means, storage means for storing the correction data computed by the computing means, and color correction means for correcting the color of a pixel associated with the source color contained in the source video image to the destination color, using the correction data stored in the storage means.

In the color correction device of the present invention, computation by the computing means is performed by a software program and the processing performed by the color correction means is performed by hardware.

In the color correction device of the present invention, the storage means is a lookup table for storing the pixel color and the correction data in association with each other.

In the color correction device of the present invention, the source color and the destination color are represented by a vector in a color space.

In the color correction device of the present invention, the parameter setting means includes means for setting parameters concerning the color hue angle and the saturation degree as parameters concerning the source color and the destination color, respectively.

In the color correction device of the present invention, the parameter setting means further includes gain setting means for setting the parameters concerning the gain value of the correction data and the computing means computes the correction data using parameters concerning the color hue angle and the saturation degree set by the parameter setting means as parameters for the source color and the destination color and parameters concerning the gain value set by the gain setting means.

In the color correction device of the present invention, the parameter setting means further includes color hue range setting means for setting parameters concerning the color hue range of the source color and, if the color contained in the source video image is within the color hue range as set by the color hue range setting means, the computing means computes the correction data using parameters concerning the color hue angle and the saturation degree set by the parameter setting means as parameters for the source color and the destination color and parameters concerning the gain value set by the gain setting means.

The present invention also provides a color correction device for correcting the colors of plural pixels making up a source video image including parameter setting means for setting plural parameters for prescribing the source color range and the destination color range in a color space, computing means for computing correction data for correcting the color contained in the source color range into color contained in the destination color range and color correction means for correcting the pixel color to a color corresponding to the destination color range based on the corrected data contained in the source color range if the color of the pixel constituting the source video image is a color contained in the source color range.

In the color correction device of the present invention, the color hue direction of the source color range is defined by a source vector on the color space and the color hue direction of the destination color range is defined by the destination vector on the color space.

In the color correction device of the present invention, the parameter setting means includes means for setting at least parameters concerning the source color hue direction, source color hue range and the source saturation degree, as plural parameters prescribing the source color range and means for setting parameters concerning at least the destination color hue direction and destination saturation degree as plural parameters prescribing the destination color range.

In the color correction device of the present invention, the parameter setting means further includes gain setting means for setting parameters concerning the gain value of the correction data and the computing means computes the correction data using parameters concerning the source color hue direction, source color hue range and source saturation degree as set by the parameter setting means, parameters concerning the destination color hue direction and the destination saturation degree and parameters concerning the gain value as set by the gain setting means.

In the color correction device of the present invention, the gain setting means sets the gain value from one color hue to another so that the closer the color hue angle to be computed to the color hue direction of the color hue range, the larger becomes the gain value, and so that the remoter the color hue angle to be computed from the color hue direction of the color hue range, the smaller becomes the gain value.

In the color correction device of the present invention, the computing means computes the correction data from one color hue to another so that the closer the color hue angle to be computed to the color hue direction of the color hue range, the larger becomes the correction data value, and so that the remoter the color hue angle to be computed from the color hue direction of the color hue range, the smaller becomes the correction data value.

In the color correction device of the present invention, the color correction means converts the pixel color to the color having the color hue angle which is closer to the destination color hue direction the closer the color hue angle of the pixel to the source hue direction, the color correction means converting the pixel color to a color having the color hue angle which is closer to the pixel color hue direction the remoter the color hue angle of the pixel from the source hue direction.

In the color correction device of the present invention, the computing means computes the correction data, selectively using a source algorithm for correcting the color of the pixel corresponding to the source color range to the color corresponding to the destination color range, while maintaining a constant source saturation degree, and also selectively using a destination algorithm for correcting the color of the pixel corresponding to the source color range to the color corresponding to the destination color range, while varying the source saturation degree.

The color correction device of the present invention is comprised of a computer having the parameter setting means and the computing means and a picture processing unit having the color correction means. In the color correction device of the present invention,. the computer is programmed for displaying on a computer monitor a graphical interface comprised of a parameter setting window for interactively setting parameters concerning the source color hue direction, source color hue range, source saturation degree, destination color hue direction and the destination saturation degree, and a view window for displaying a video image prior to color correction by the color correction means and a video image subsequent to color correction.

The present invention also provides a color correction method for correcting the colors of plural pixels making up a source video image including setting a plurality of parameters for prescribing a source color range and a destination color range in a color space, computing correction data for correcting the color contained in the source color range to the color contained in the destination color range, and correcting the color of the pixel to the color corresponding to the destination color range, based on the correction data, if the color of the pixel constituting the source video image is the color contained in the source color range.

In the color correction method of the present invention, at least parameters concerning the source color hue direction, source color hue range and the source saturation degree are set as the plural parameters for prescribing the source color range, and parameters concerning at least the destination color hue direction and the destination saturation degree are set as the plural parameters for prescribing the destination color range.

In the color correction method of the present invention, parameters concerning the gain value of the correction data are set and the correction data are computed using parameters concerning the source color hue direction, source color hue range, source saturation degree, destination color hue direction and the destination saturation degree, and also using parameters concerning the gain.

In the color correction method of the present invention, the gain is set in association with each color hue angle so that the closer the color hue angle to be computed to the color hue direction of the color hue range, the larger becomes the gain value, and so that the remoter the color hue angle to be computed from the color hue direction of the color hue range, the smaller becomes the gain value.

In the color correction method of the present invention, the correction data is computed from one color hue angle to another so that the closer the color hue angle to be computed to the color hue direction of the color hue range, the larger becomes the value of the correction data, and so that the remoter the color hue angle to be computed from the color hue direction of the color hue range, the smaller becomes the value of the correction data.

In the color correction method of the present invention, the closer the color hue angle of the pixel to the color hue direction of the source, the closer to the destination color hue direction is the color hue angle of the color to which is converted the pixel color, and the remoter the color hue angle of the pixel from the source color hue direction, the closer to the pixel color hue angle is the color hue angle of the color to which is converted the pixel color.

In the color correction method of the present invention, the correction data is computed, selectively using a source algorithm for correcting the pixel color corresponding to the source color range to the color corresponding to the destination color range while maintaining the source saturation degree constant and a destination algorithm for correcting the pixel color corresponding to the source color range to the color corresponding to the destination color range while varying the source saturation degree.

The present invention also provides a color correction device for correcting plural pixel colors constituting a source video image, including parameter setting means for setting parameters concerning first to N'th source vectors and first to N'th destination vectors individually associated with the first to N'th source vectors in a color space, computing means for computing comprehensive correction data based on plural correction data from the first correction data for correcting the color represented by the first source vector to the color represented by the first destination vector up to the N'th correction data for correcting the color represented by the N'th source vector to the color represented by the N'th destination vector and color correction means for correcting the color of the pixel to the color of the destination vector associated with the source vector, based on the comprehensive correction data computed by the computing means, if the color of the pixel constituting the source video image is the color on any of the first to N'th source vectors.

In the color correction device of the present invention, the parameter setting means further includes means for setting parameters concerning the first to N'th color hue window for specifying the color hue range of the source vector and parameters concerning the gain values of the first to N'th color hue windows in association with the first to N'th source vectors.

In the color correction device of the present invention, the computing means computes the comprehensive correction data based on the first to N'th source vectors, first to N'th gain values of the first to N'th color hue windows and the first to N'th correction data.

In the color correction device of the present invention, the parameter setting means computes the parameters concerning the gain value from one color hue angle to another so that the closer the color hue angle to be computed to the source vector, the larger is the value of the correction data, and so that the remoter the color hue angle to be computed from the source vector, the smaller is the gain value.

In the color correction device of the present invention, the computing means computes the correction data corresponding to the distance from the source vector so that the closer the color hue angle to be computed to the source vector, the smaller becomes the value of the correction data, and so that the remoter the color hue angle to be computed from the source vector, the smaller becomes the value of the correction data.

In the color correction device of the present invention, the closer the color hue angle of the pixel to the source vector, the closer to the destination vector becomes the color hue angle of the color to which is converted the pixel color, and the remoter the color hue angle of the pixel from the source vector, the closer to the pixel color hue angle is the color hue angle of the color to which is converted the pixel color.

In the color correction device of the present invention, the correction data is computed, selectively using a first algorithm for correcting the pixel color corresponding to the first color range to the color corresponding to the second color range while maintaining the source saturation degree constant and a second algorithm for correcting the pixel color corresponding to the first color range to the color corresponding to the second color range while varying the source saturation degree.

The color correction device of the present invention is comprised of a computer having the parameter setting means and the computing means and a picture processing unit having the color correction means.

In the color correction device of the present invention, the computer is programmed for displaying on a computer monitor a graphical interface comprised of a parameter setting window for interactively setting parameters concerning the color hue range of the source vector and the destination vector and a view window for displaying a video image prior to color correction by the color correction means and a video image subsequent to color correction.

The present invention provides a color correction method for correcting the colors of plural pixels making up a source video image includes setting parameters concerning first to N'th destination vectors individually associated with the first to N'th source vectors, computing comprehensive correction data based on plural correction data from first correction data for correcting the color represented by the first source vector to the color represented by the first destination vector up to the N'th correction data for correcting the color represented by the N'th source vector to the color represented by the N'th destination vector and correcting the pixel color to the color of the destination vector associated with the source vector, based on the comprehensive correction data, if the pixel color making up the source video image is the color on one of the first to N'th source vectors.

The color correction method of the present invention further includes setting parameters concerning the first to N'th color hue window for specifying the color hue range of the source vector and parameters concerning the gain value of the first to N'th correction data in association with the first to N'th source vectors.

The color correction method of the present invention further includes computing the comprehensive correction data based on the first to N'th source vectors, first to N'th destination vectors, first to N'th color hue windows and on parameters concerning the first to N'th correction data.

The color correction method of the present invention further includes setting the parameters concerning the gain value from one color hue angle to another so that the closer the color hue angle to be computed to the source vector, the larger becomes the gain, and so that the remoter the color hue angle to be computed from the source vector, the smaller becomes the gain value.

The color correction method of the present invention further includes computing correction data corresponding to the separation from the source vector so that the closer the color hue angle to be computed to the source vector, the larger becomes the value of each correction data and so that the remoter the color hue angle to be computed from the source vector, the smaller becomes the value of each correction data.

In the color correction method of the present invention, the closer the color hue angle of the pixel to the source vector, the closer to the destination vector is the color hue angle of the color to which is converted the pixel color, and the remoter the color hue angle of the pixel from the source vector, the closer to the pixel color hue angle is the color hue angle of the color to which is converted the pixel color.

In the color correction method of the present invention, the correction data is computed, selectively using a first algorithm for correcting the pixel color corresponding to the first color range to the color corresponding to the second color range while maintaining the source vector constant and a second algorithm for correcting the pixel color corresponding to the first color range to the color corresponding to the second color range while varying the source vector.

The present invention also provides a color correction device for correcting plural pixel colors constituting a source video image including vector designating means for designating plural destination vectors individually associated with the source vectors in a color space, computing means for computing comprehensive correction data for correcting colors on the plural source vectors to the color represented individually associated with the plural source vectors and color correction means for correcting the color of the pixel constituting the source video image to the color of the destination vector associated with the source vector, based on the comprehensive correction data, if the color of the pixel is the color on any of the plural source vectors.

The present invention also provides a color correction method for correcting the colors of plural pixels making up a source video image includes setting parameters concerning first to N'th destination vectors individually associated with the first to N'th source vectors, computing comprehensive correction data based on plural correction data from first correction data for correcting the color represented by the first source vector to the color represented by the first destination vector up to the N'th correction data for correcting the color represented by the N'th source vector to the color represented by the N'th destination vector, and correcting the pixel color to the color of the destination vector associated with the source vector, based on the comprehensive correction data, if the pixel color making up the source video image is the color on one of the first to N'th source vectors.

The color correction method of the present invention further includes setting parameters concerning the first to N'th color hue window for specifying the color hue range of the source vector and parameters concerning the gain value of the first to N'th correction data in association with the first to N'th source vectors.

The color correction method of the present invention further includes computing the comprehensive correction data based on the first to N'th source vectors, first to N'th destination vectors, first to N'th color hue windows and on parameters concerning the first to N'th correction data.

The color correction method of the present invention further includes setting the parameters concerning the gain value from one color hue angle to another so that the closer the color hue angle to be computed to the source vector, the larger becomes the gain, and so that the remoter the color hue angle to be computed from the source vector, the smaller becomes the gain value.

The color correction method of the present invention further includes computing correction data corresponding to the separation from the source vector so that the closer the color hue angle to be computed to the source vector, the larger becomes the value of each correction data and so that the remoter the color hue angle to be computed from the source vector, the smaller becomes the value of each correction data.

In the color correction method of the present invention, the closer the color hue angle of the pixel to the source vector, the closer to the destination vector is the color hue angle of the color to which is converted the pixel color, and so that the remoter the color hue angle of the pixel from the source vector, the closer to the pixel color hue angle is the color hue angle of the color to which is converted the pixel color.

In the color correction method of the present invention, the correction data is computed, selectively using a first algorithm for correcting the pixel color corresponding to the first color range to the color corresponding to the second color range while maintaining the source vector constant and a second algorithm for correcting the pixel color corresponding to the first color range to the color corresponding to the second color range while varying the source vector.

The present invention also provides a color correction device for correcting plural pixel colors constituting a source video image including vector designating means for designating plural destination vectors individually associated with the source vectors in a color space, computing means for computing comprehensive correction data for correcting colors on the plural source vectors to the color represented individually associated with the plural source vectors and color correction means for correcting the color of the pixel constituting the source video image to the color of the destination vector associated with the source vector, based on the comprehensive correction data, if the color of the pixel is the color on any of the plural source vectors.

The present invention also provides a picture processing apparatus including data correcting means having a lookup table and adapted for correcting input data by the lookup table for outputting the corrected data, and table updating means for updating the contents of the lookup table, the lookup table holding data corresponding to chroma signals of picture signals.

In the picture processing apparatus of the present invention, the data correcting means has polar coordinate transforming means for transforming the chroma signals into polar coordinate signals for generating angular data corresponding to the chroma signals referenced to a predetermined reference axis, the lookup table outputting data it holds using the angular data as addresses.

In the picture processing apparatus of the present invention, the polar coordinate transforming means outputs the angular data with a number of bits larger than the chroma signals.

In the picture processing apparatus of the present invention, the lookup table outputs correction data correcting the picture signals, using data of the color hue of the picture signals as addresses, and the data correction means includes polar coordinate transforming means for transforming the chroma signals by polar coordinate transformation for outputting the data of the color hue of the chroma signals to the lookup table, and computational processing means for correcting the chroma signals by the correction data.

In the picture processing apparatus of the present invention, the lookup table outputs correction data correcting the color hue and the saturation degree of the picture signals, using data of the color hue of the picture signals as addresses and the data correction means includes polar coordinate transforming means for transforming the chroma signals by polar coordinate transformation for outputting the data of the color hue of the chroma signals to the lookup table, and computational processing means for correcting the chroma signals by the correction data.

In the picture processing apparatus of the present invention, the lookup table outputs correction data correcting luminance and the color hue of the picture signals, using data of the color hue of the picture signals as addresses and the data correction means includes polar coordinate transforming means for transforming the chroma signals by polar coordinate transformation for outputting the data of the color hue of the chroma signals to the lookup table, and computational processing means for correcting the chroma signals by the correction data.

In the picture processing apparatus of the present invention, the table updating means includes at least input means for inputting the color hue of a processing object and the color hue of a processing target and data generating means for generating data for storage in the lookup table, the data generating means generating the data for storage in the lookup table for correcting the color hue of the processing object in the picture signals to the color hue of the processing target using the color hue of the processing object and the color hue of the processing target as reference.

In the picture processing apparatus of the present invention, the table updating means includes at least input means for inputting the color hue and the saturation degree of a processing object and the color hue and the saturation degree of a processing target and data generating means for generating data for storage in the lookup table, the data generating means generating the data for storage in the lookup table for correcting the color hue and the saturation degree of the processing object in the picture signals to the color hue and the saturation degree of the processing target using the color hue and the saturation degree of the processing object and the color hue and the saturation degree of the processing target as reference.

In the picture processing apparatus of the present invention, the data generating means has at least input means for inputting the range of the processing object and data generating means for generating data for storage in the table updating means and the data generating means weights the correction value by a weighting function maintained at a significant value in a range of the processing object for generating data for storage in the lookup table for correcting the color hue of the processing object to the color hue of the processing target.

In the picture processing apparatus of the present invention, the table updating means includes input means for inputting at least the extent of processing and data generating means for generating data stored in the lookup table and the data generating means weighting the correction value by a preset function to generate data stored in the lookup table to correct the color hue of the processing object to that of the processing target.

In the picture processing apparatus of the present invention, the table updating means includes input means for inputting a plurality of sets of the color hue of the processing object and the color hue of the processing target and data generating means for generating data for storage in the lookup table, the data generating means generating correction data for correcting the color hue of the processing object to the color hue of the processing target for each of the sets of the color hues of the processing object and the processing target, and collecting the correction data of each set to generate data for storage in the lookup table.

The present invention also provides a picture processing apparatus including first data correction means having a first lookup table for correcting input data by the first lookup table for outputting the corrected data, second data correction means having a second lookup table for correcting input data by the second lookup table for outputting the corrected data and table updating means for updating the contents of the first and second lookup tables, the first lookup table holding data corresponding to the luminance level of picture signals and the second lookup table holding data corresponding to the chroma level of picture signals.

The present invention also provides a picture processing apparatus for correcting the color hue of a picture being processed, including color hue correction means for weighting the color hue of each pixel of the picture being processed with a predetermined correction value by a weighting function held at a significant value in a range referenced to a predetermined reference color hue for correcting the color hue of each pixel of the picture being processed to a color hue of a processing object, picture displaying means for displaying a color distribution picture obtained on projecting pixels of the picture being processed, represented in a three-dimensional space, on a uv plane, and updating processing means for changing the condition for correcting the color hue by designation on the color distribution picture.

In the picture processing apparatus of the present invention, the updating processing means displays the correction range by the weighting function on the color distribution picture and changes the correction range by designation on the color distribution picture to change the color hue correction condition to correct the color hue.

In the picture processing apparatus of the present invention, the updating processing means accepts pixel designation on the picture being processed to display a marker at a position in register with the accepted pixel on the color distribution picture.

In the picture processing apparatus of the present invention, the updating processing means displays the reference color hue on the color distribution picture and changes the reference color hue by designation on the color distribution picture to change the color hue correction condition.

In the picture processing apparatus of the present invention, the updating processing means accepts pixel designation on the picture being processed to display a marker at a position on the picture being processed in register with the accepted pixel.

In the picture processing apparatus of the present invention, the updating processing means displays the color hue of a correction target corresponding to the reference color hue on the color distribution picture and changes the color hue of the correction target by designation on the color distribution picture to change the correction amount to change the color hue correcting condition.

In the picture processing apparatus of the present invention, the updating processing means accepts pixel designation on the picture being processed to display a marker at a position on the picture being processed in register with the accepted pixel.

The present invention also provides a picture processing method for correcting the color hue of a picture being processed including weighting the color hue of each pixel of a picture being processed with a predetermined correction value by a weighting function held at a significant value in a range referenced to a predetermined reference color hue for correcting the color hue of each pixel of the picture being processed to a color hue of a processing target, displaying a color distribution picture obtained on projecting pixels of the picture being processed, represented in a three-dimensional space, on a uv plane, and changing the condition for color hue correction by designation on the color distribution picture.

The picture processing method of the present invention further includes displaying the range of correction by the weighting function on the color distribution picture, and changing the correction range by designation on the color distribution picture to change the color hue correcting condition.

The picture processing method of the present invention further includes accepting pixel designation on the picture being processed and displaying a marker on the color distribution picture in register with the accepted pixel.

The picture processing method of the present invention further includes displaying the reference color hue on the color distribution picture and changing the reference color hue by designation on the color distribution picture for changing the color hue correcting condition.

The picture processing method of the present invention further includes accepting pixel designation on the picture being processed and displaying a marker on the color distribution picture in register with the accepted pixel.

The picture processing method of the present invention further includes displaying the color hue of the correction target corresponding to the reference color hue on the color distribution picture and changing the color hue of the correction target by designation on the color distribution picture to change the amount of correction to change the color hue correction condition.

The picture processing method of the present invention further includes accepting pixel designation on the picture being processed and displaying a marker on the color distribution picture in register with the accepted pixel.

BRIEF DESCRIPTION OF THE DRAWINGS

The file of this patent contains at least one drawing executed in color. Copies of this patent with color drawings will be provided by the Patent and Trademark Office upon request and payment of the necessary fee.

Figure 30:
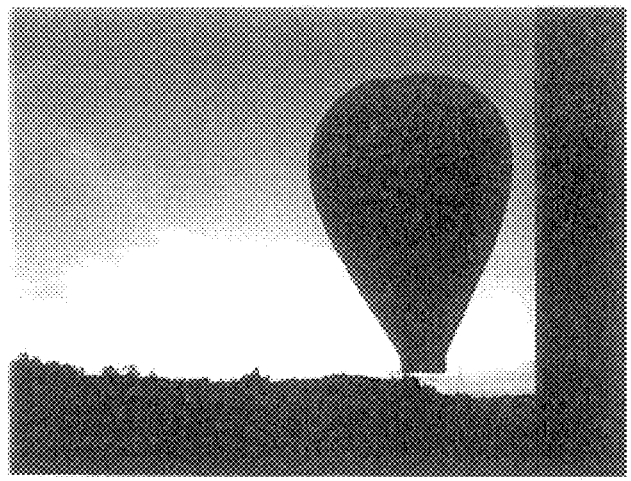
FIG. 30 is photo showing another example of secondary processing by the secondary processing unit shown in FIG. 19.

19 for the source video image shown in FIG. 30, by emphasizing the saturation degree of blue, yellow and red components.

Figure 19:
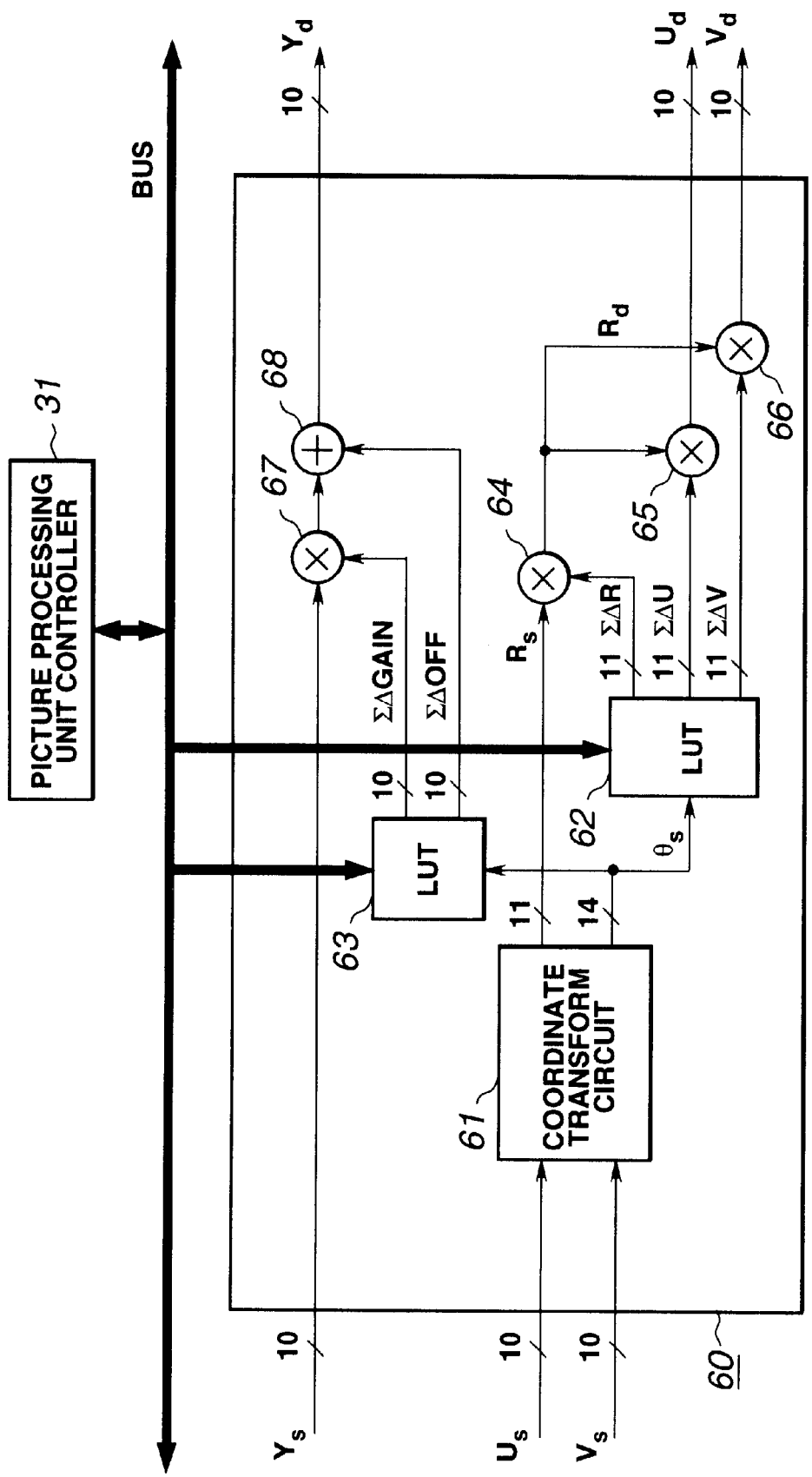
FIG. 19 is a block diagram showing an illustrative structure of the secondary processing unit of the picture processing apparatus in the above editing apparatus.
Figure 32:
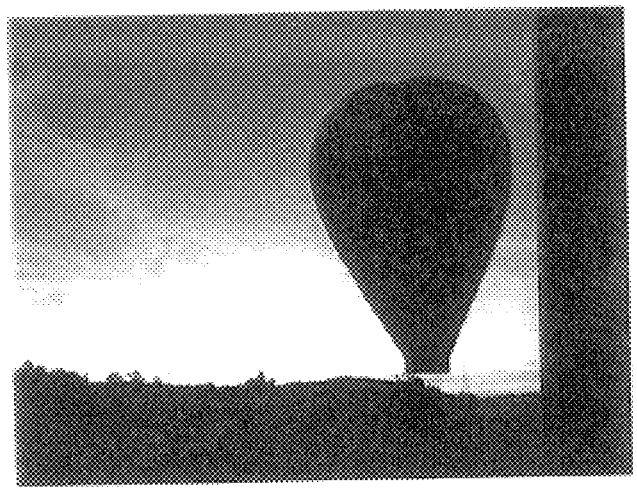

FIG. 32 is a photo showing the results of secondary processing for the source video image shown in FIG. 30 by the secondary processing unit shown in FIG. 19, by reducing the yellow component under the above conditions.

Figure 33:
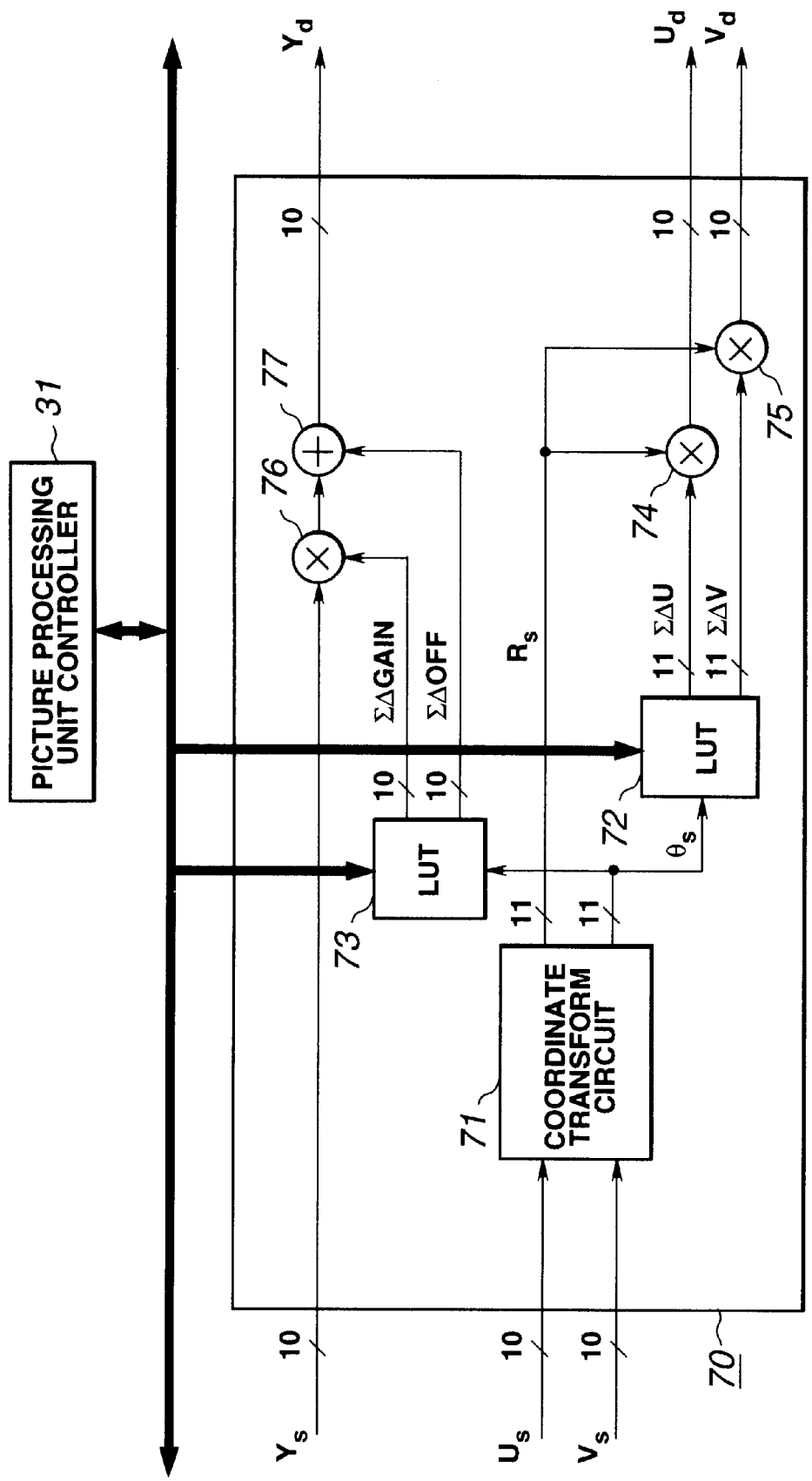

FIG. 33 is a block diagram showing another illustrative structure of the secondary processing unit of the picture processing device in the above editing apparatus.

Figure 34:

FIG. 34 is a photo showing an example of the source video image processed by the secondary processing unit shown in FIG. 33 with secondary processing.

Figure 35:

FIG. 35 is a photo showing the results of secondary processing by the secondary processing unit for the source video image shown in FIG. 34 by designating the color hue of 115° (luminance level of 107 gradations) for the source vector and by setting the color hue of 87° for the destination vector, with the saturation degree of 71, for the source video image shown in FIG. 34.

Figure 36:

FIG. 36 is a photo showing the results of secondary processing by the secondary processing unit shown in FIG. 34 by setting the color hue of 308° for the destination vector for the source video image shown in FIG. 33.

Figure 37:

FIG. 37 is a photo showing the results of secondary processing by the secondary processing unit shown in FIG. 33 by setting the color hue of 222° for the destination vector for the source video image shown in FIG. 34.

Figure 38:
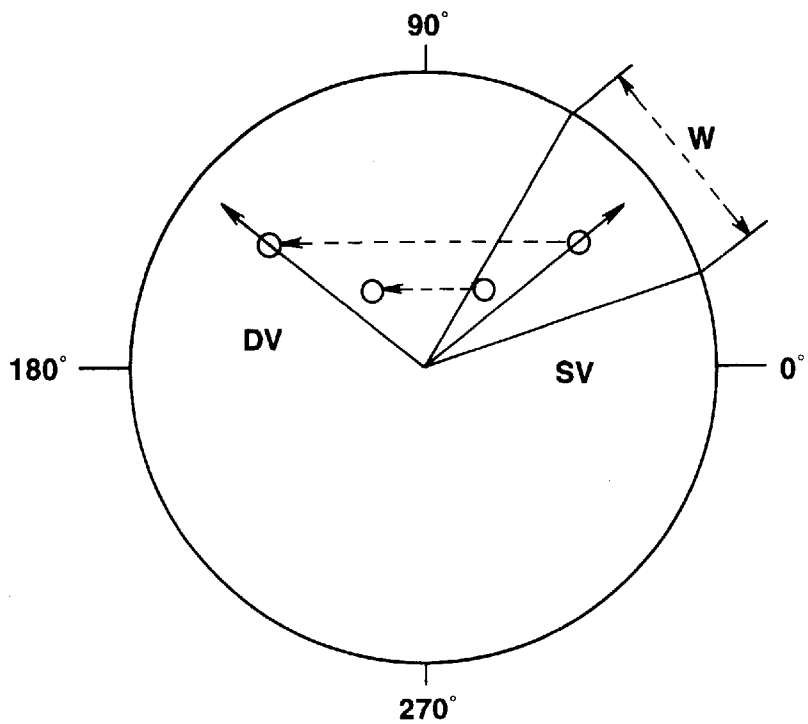

FIG. 38 illustrates correction of the color hue by the secondary processing unit shown in FIG. 19.

Figure 39:
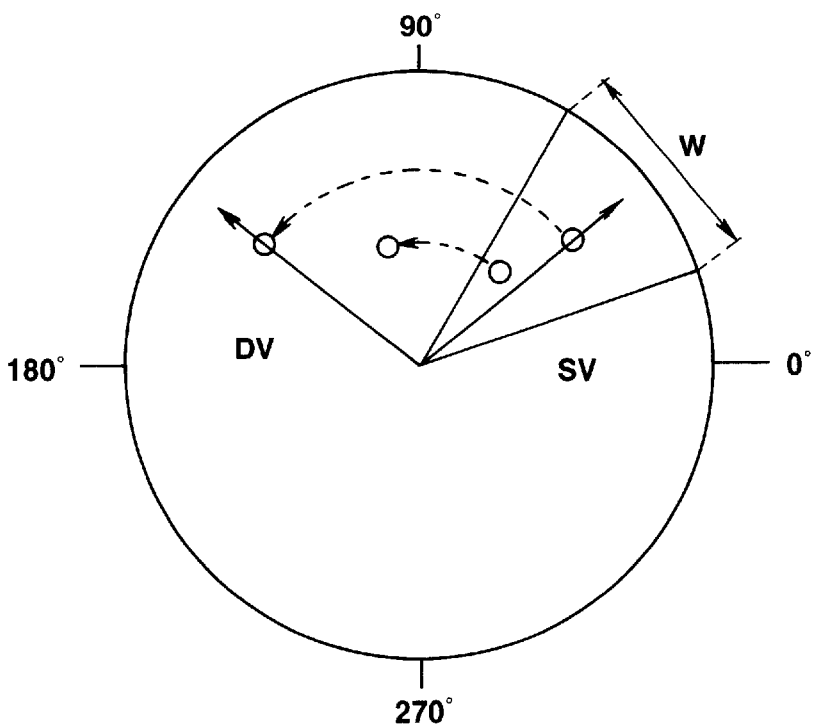

FIG. 39 illustrates correction of the color hue by the secondary processing unit shown in FIG. 33.

Figure 40:
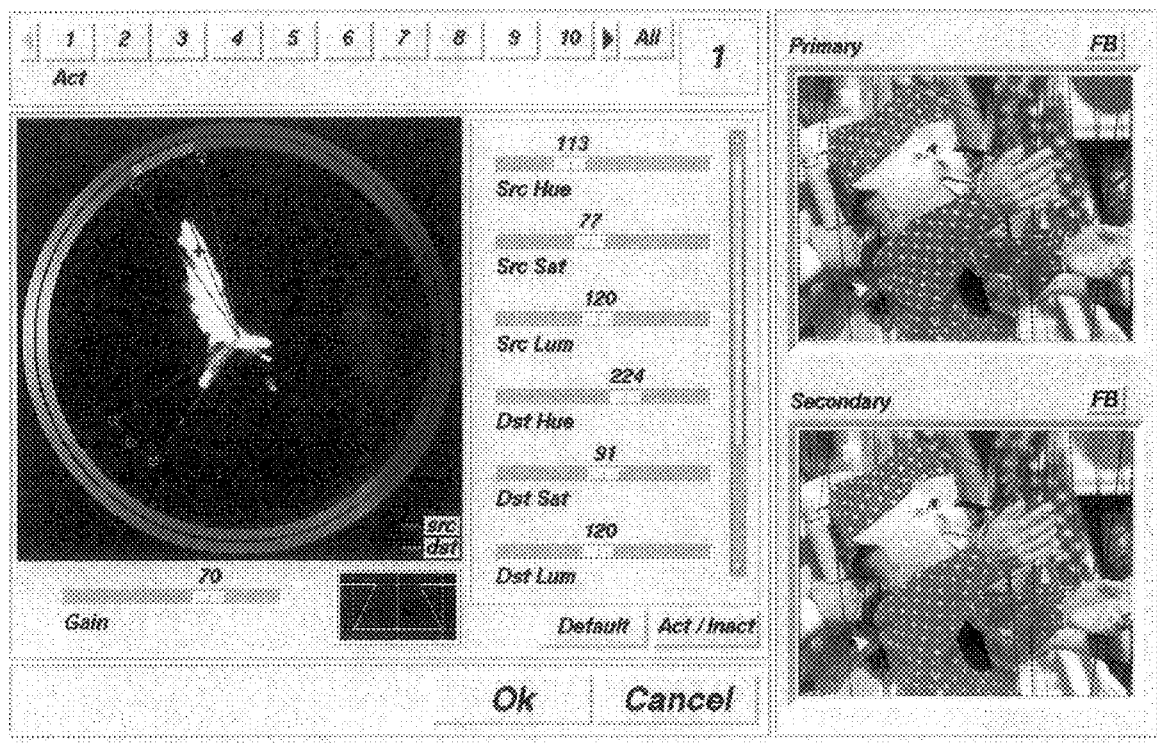

FIG. 40 is a photo showing a practical example of condition setting pictures of secondary processing displayed on a screen of a monitor device in the editing apparatus.

Figure 41:
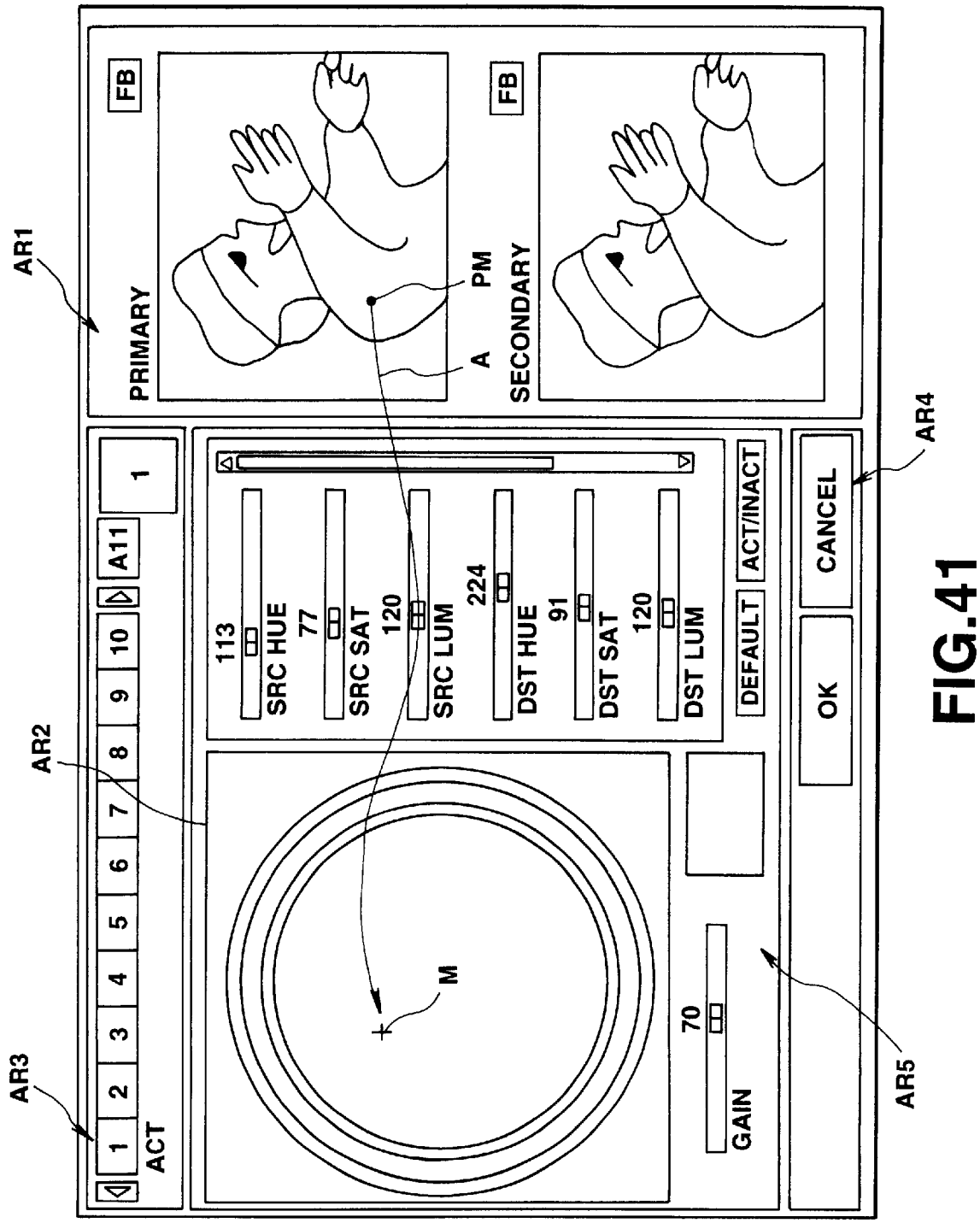

FIG. 41 schematically shows a condition setting screen of the secondary processing.

Figure 42:
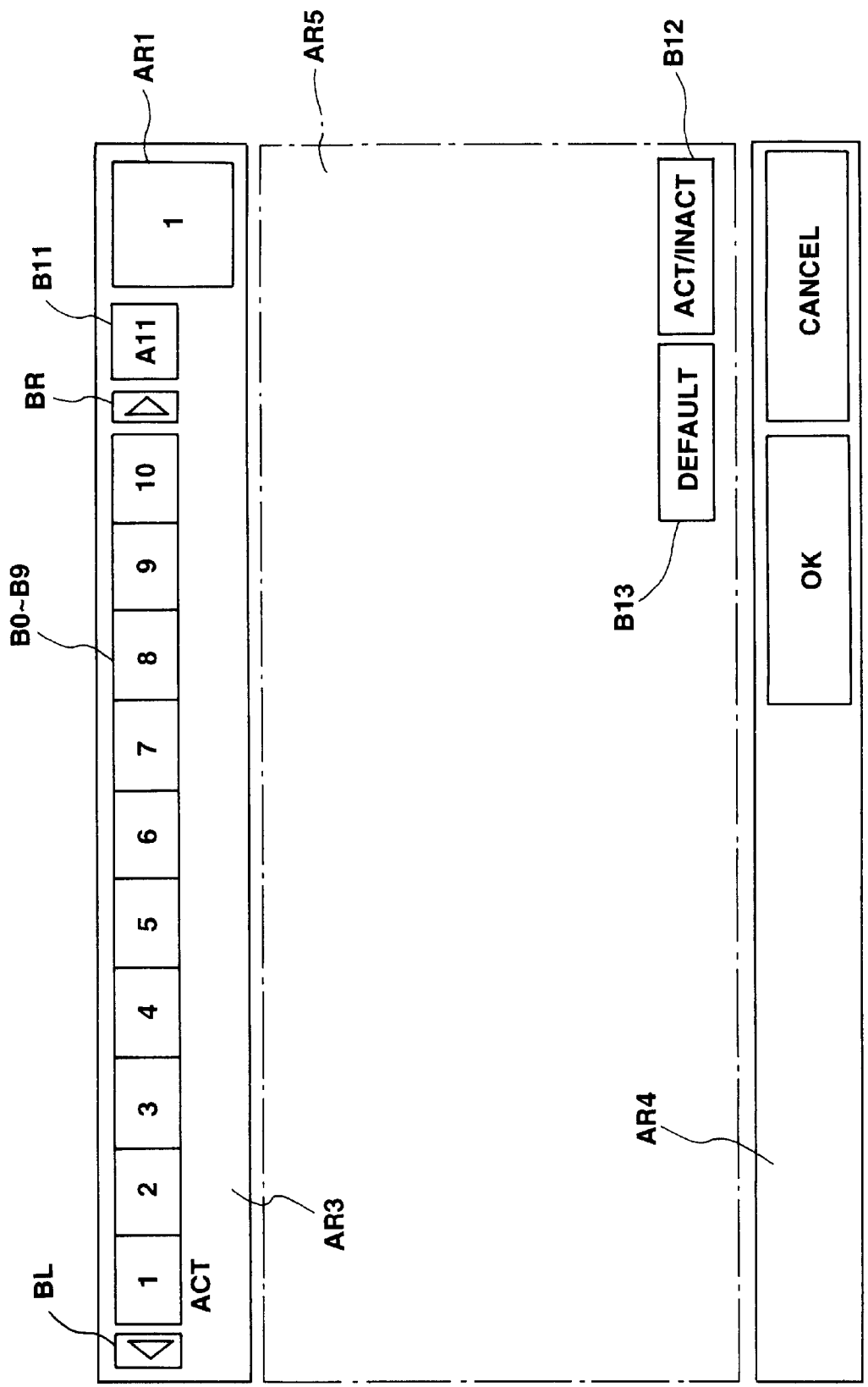

FIG. 42 schematically shows, along with a portion of a vector parameter setting unit, a vector selection unit and a system setting unit in the condition setting screen of the secondary processing.

Figure 43:
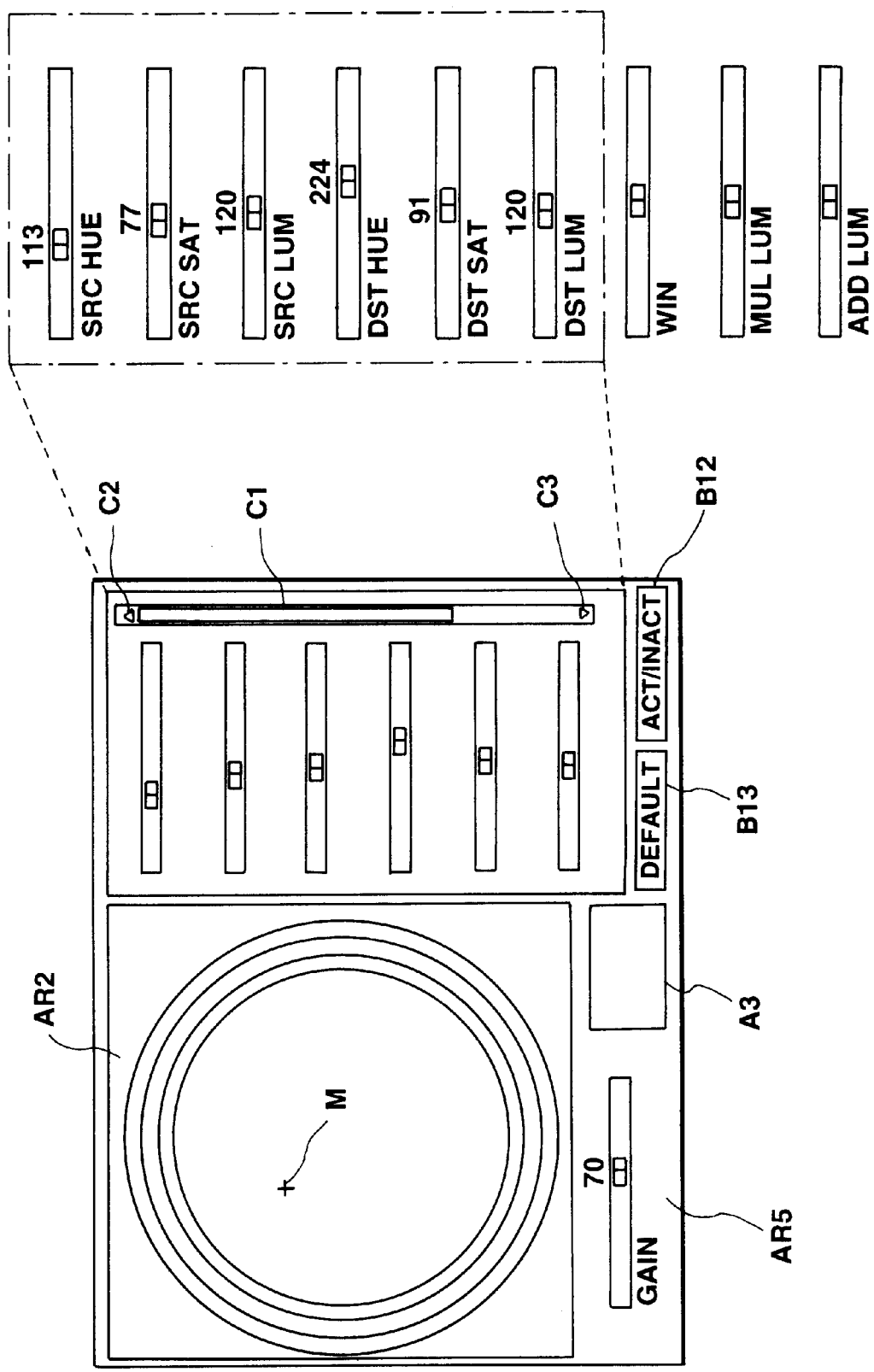

FIG. 43 schematically shows the vector parameter setting unit of the condition setting screen of the secondary processing.

Figure 44:
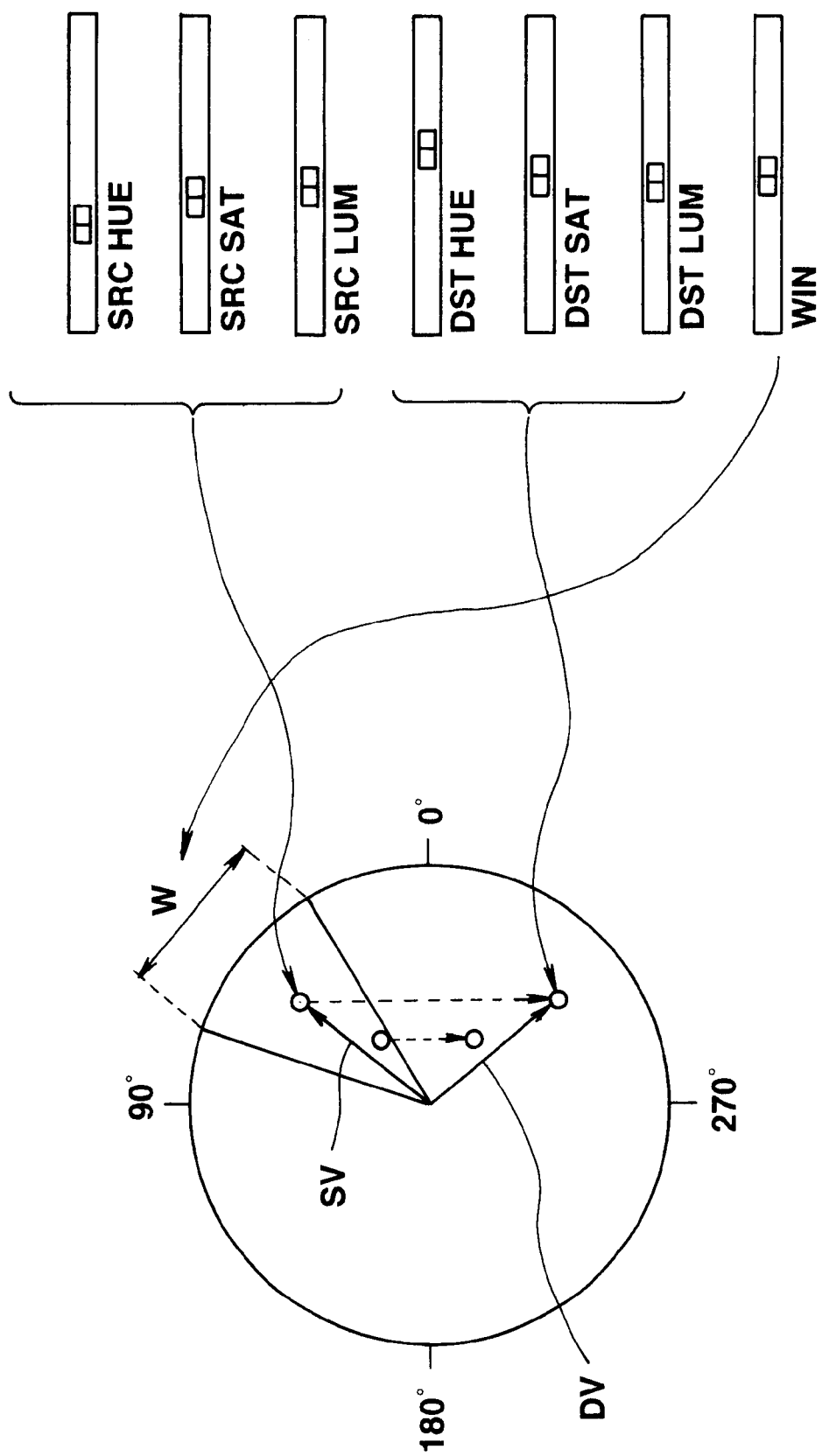

FIG. 44 schematically shows the relation between a control bar on the condition setting screen of the secondary processing the color correction processing.

Figure 45:
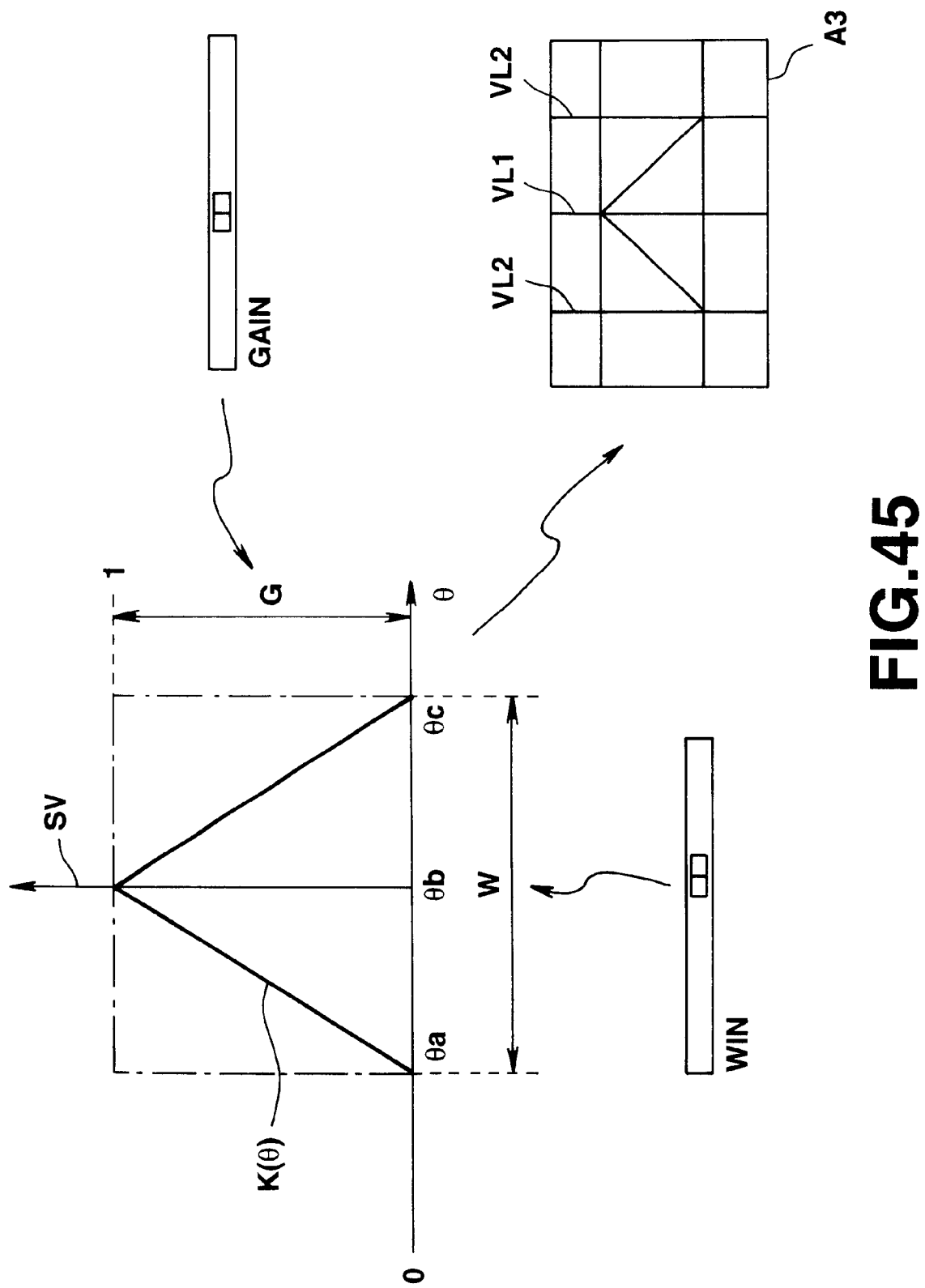

FIG. 45 illustrates the setting of the weighting function on the condition setting screen of the secondary processing.

Figure 46:
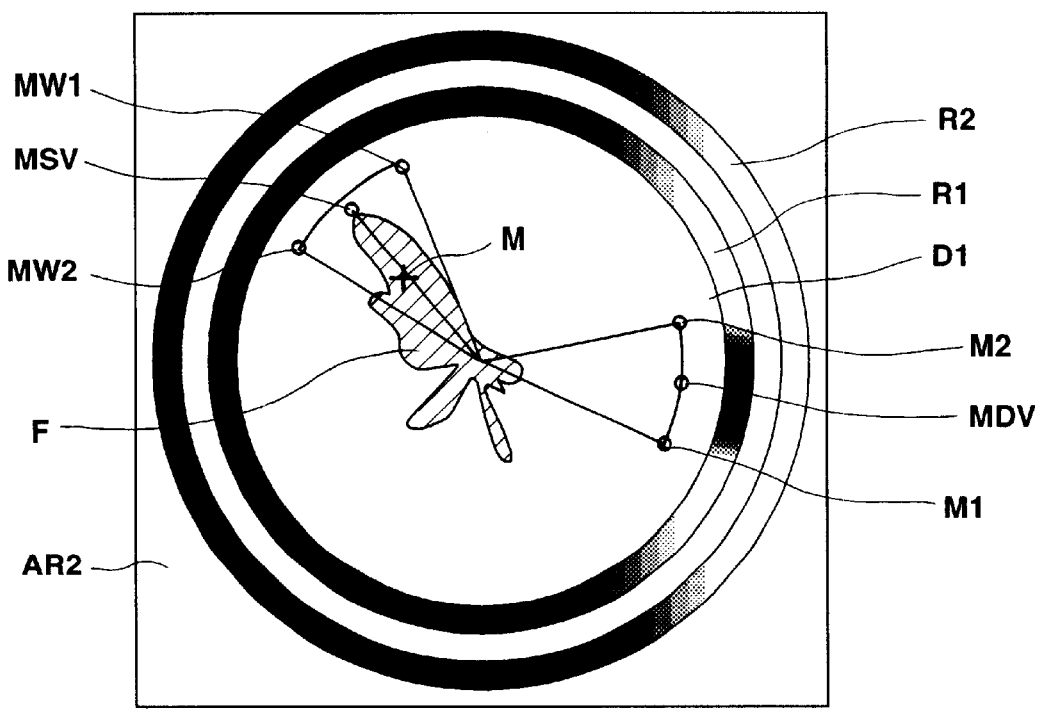

FIG. 46 is detailed view showing a vector scope unit of the condition setting screen of the secondary processing.

Figure 47:
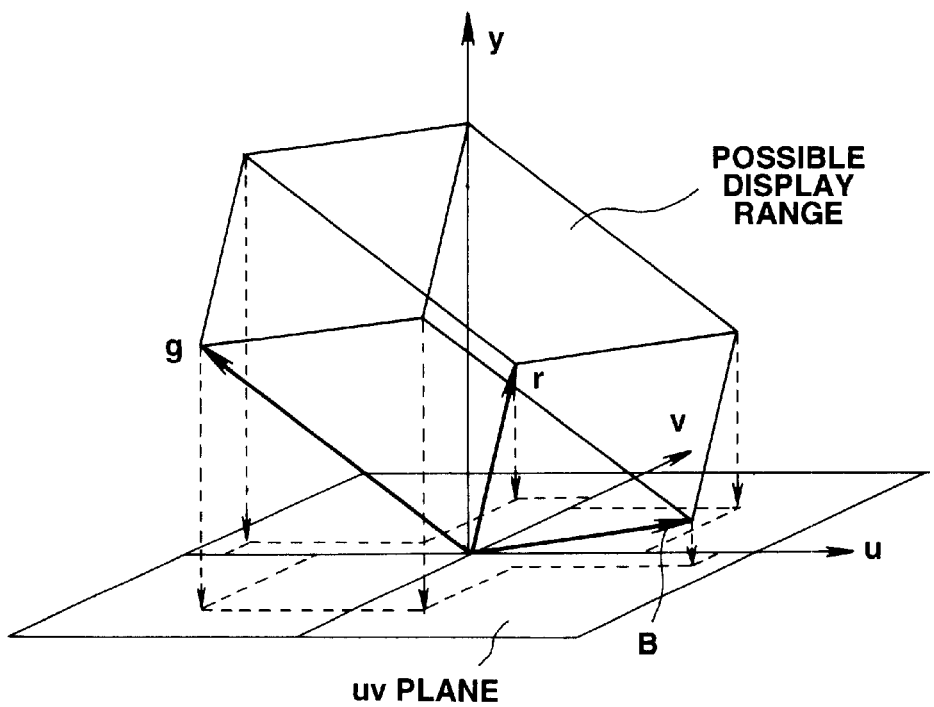

FIG. 47 illustrates the color space.

Figure 48:
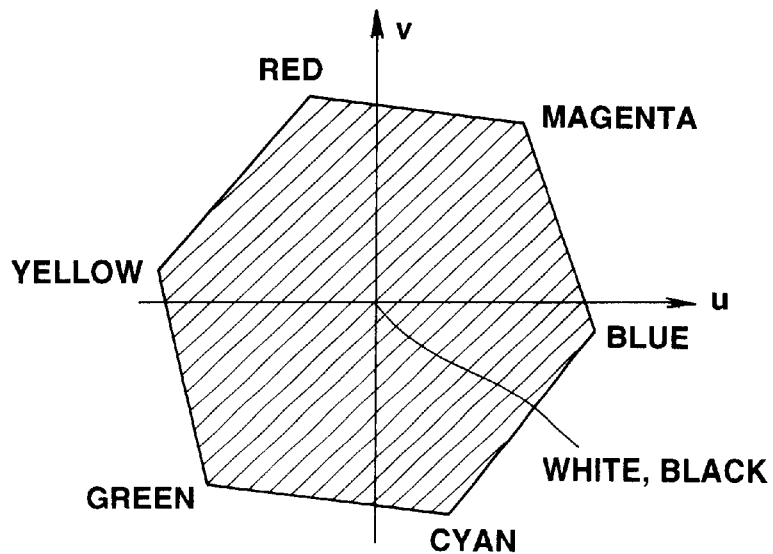

FIG. 48 shows the relation between the color bar reference color and the uv plane.

Figure 49:
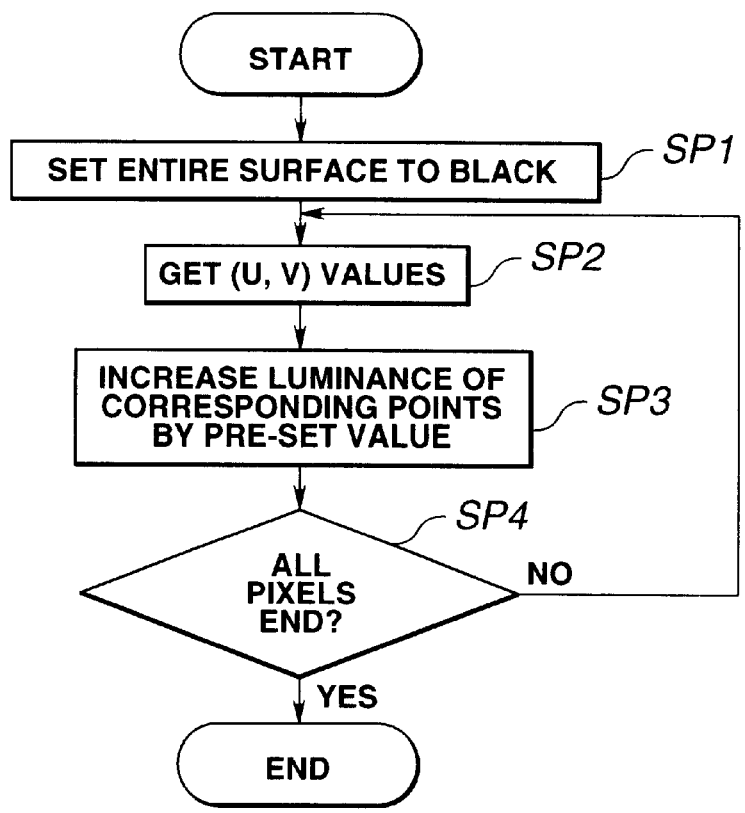

FIG. 49 is a flowchart showing the sequence of formulating a color distribution picture.

Figure 50:
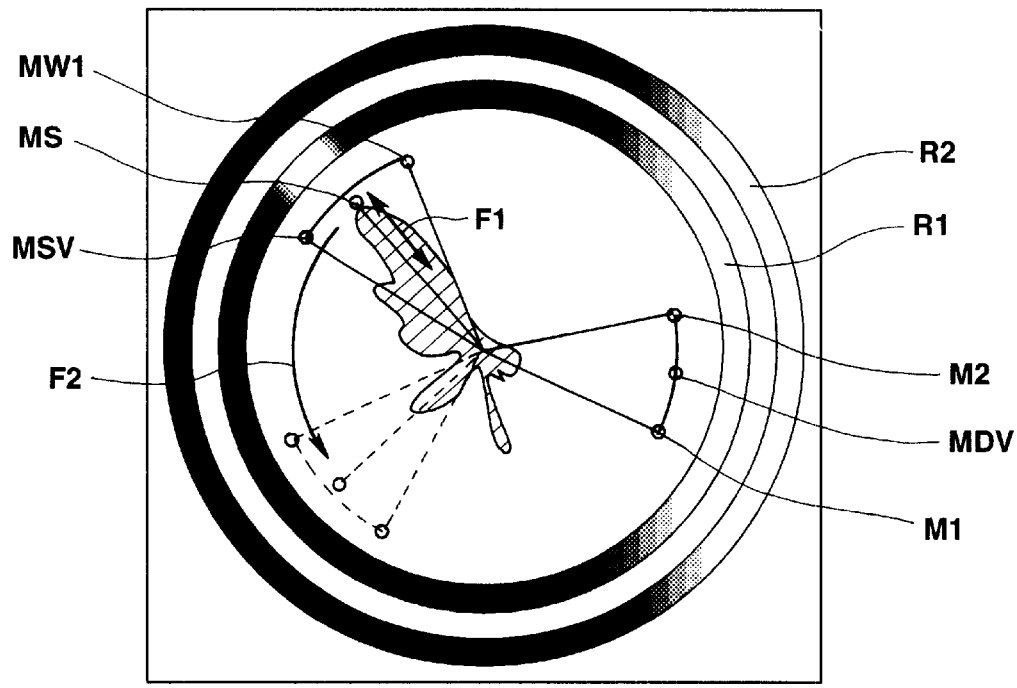

FIG. 50 illustrates the operation of a source vector in the vector scope unit.

Figure 51:
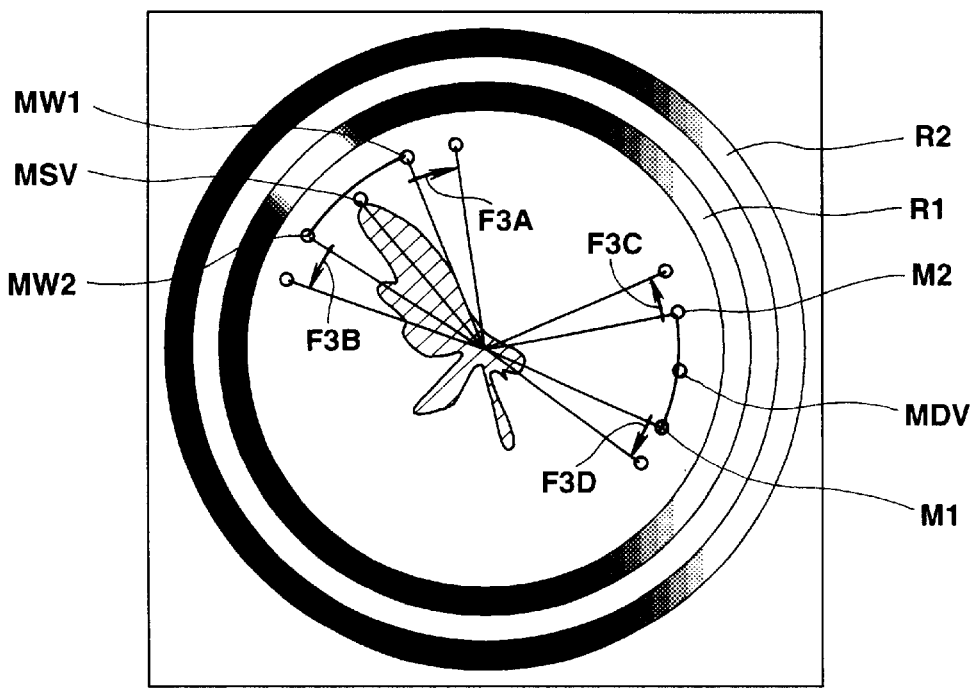

FIG. 51 illustrates the operation on the range of the weighting function in the vector scope unit.

Figure 52:
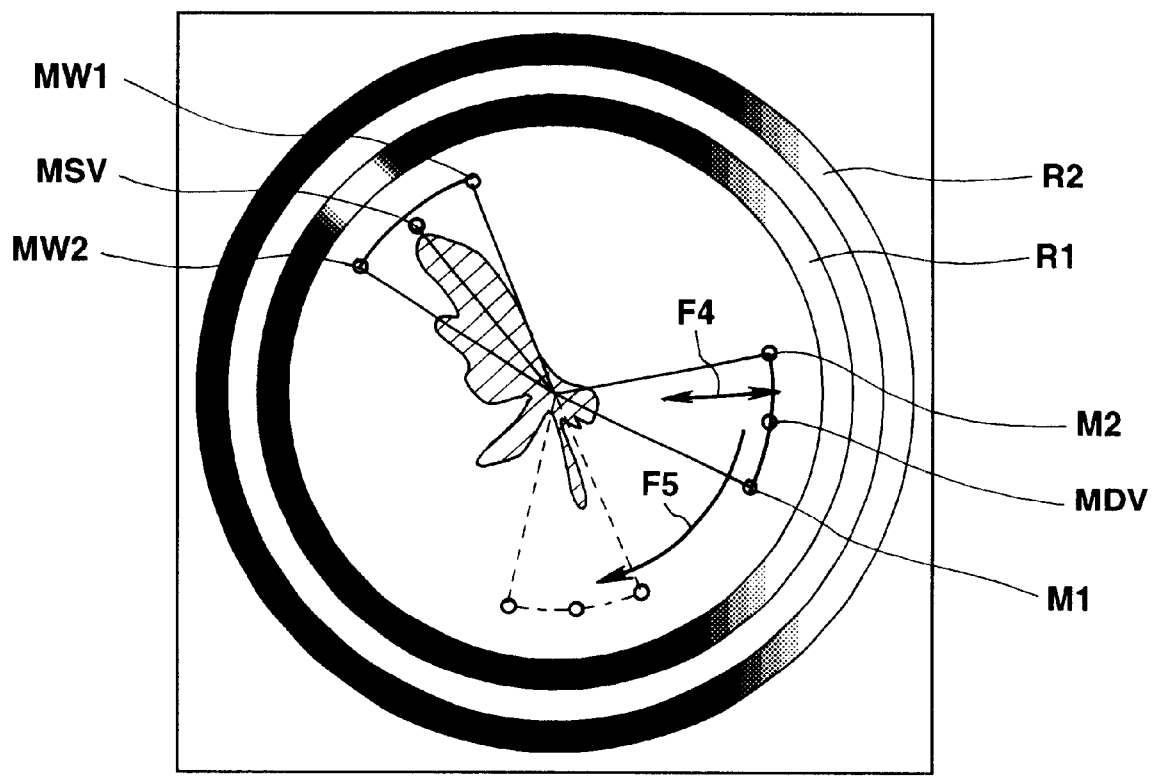

FIG. 52 illustrates the operation on the target vector in the above vector scope unit.

Figure 53:
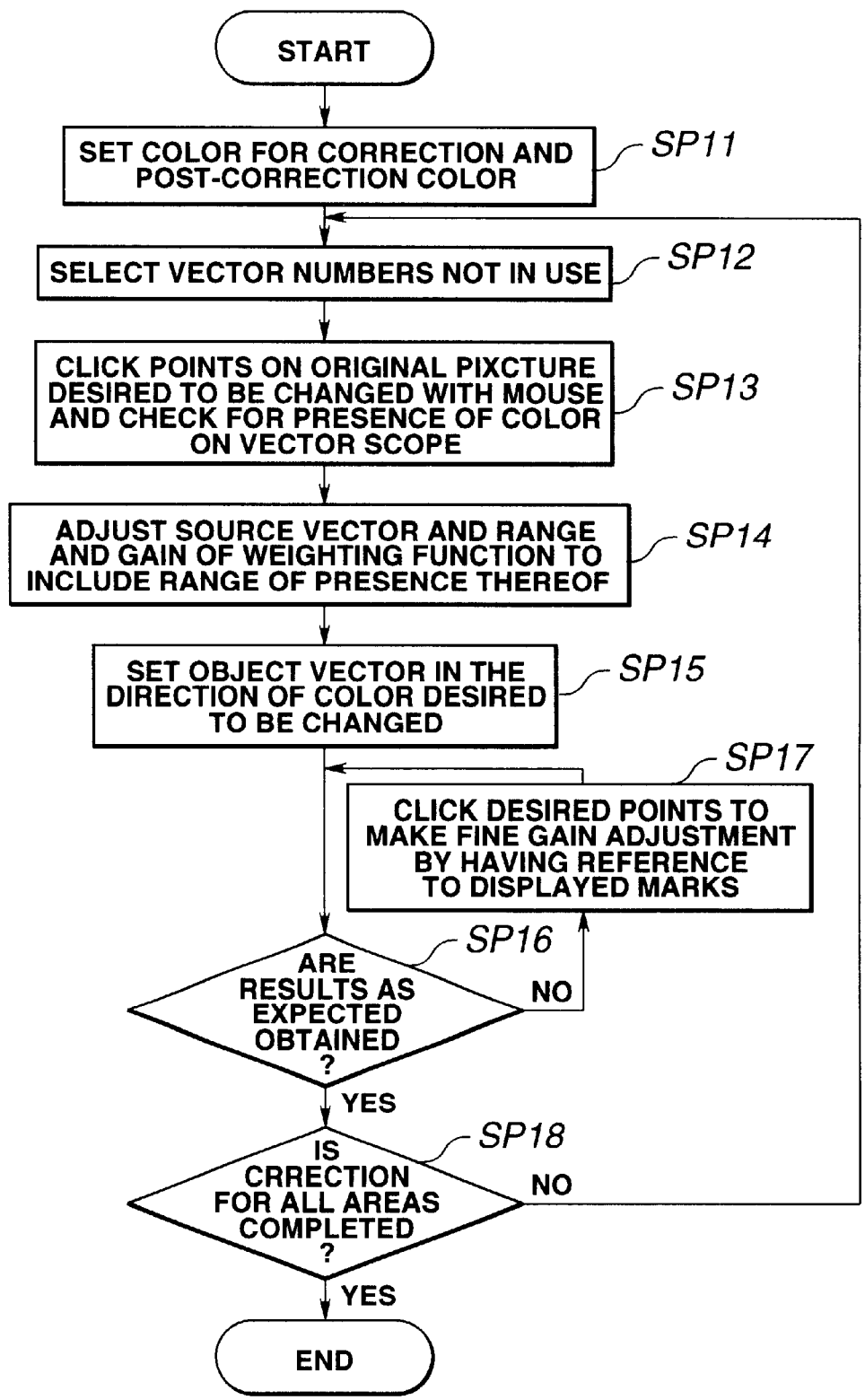

FIG. 53 is a flowchart for illustrating the operating sequence in the above editing apparatus.

BEST MODE FOR CARRYING OUT THE INVENTION

Referring to the drawings, the best mode for carrying out the invention is explained in detail.

Figure 1:
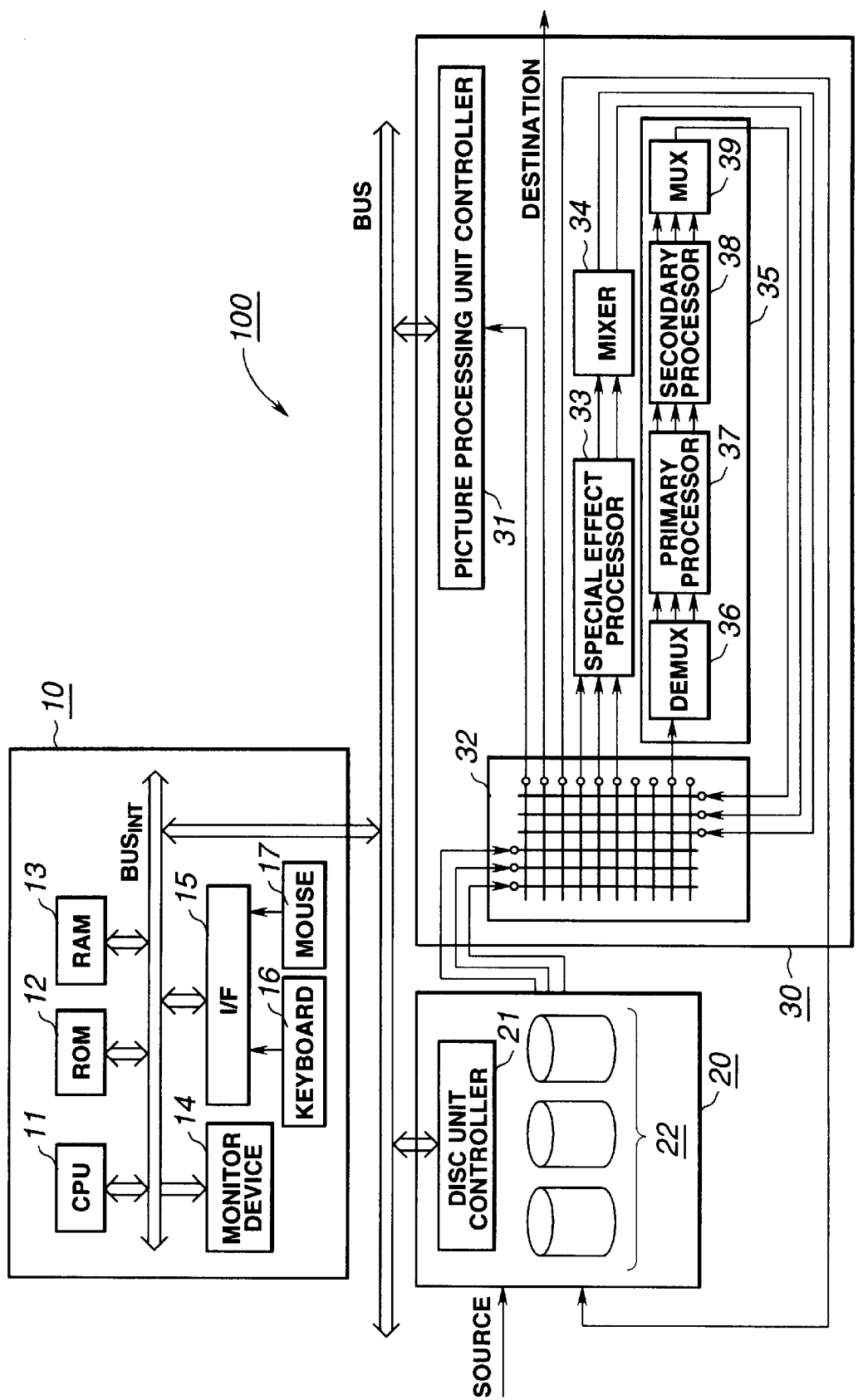
FIG. 1 is a block diagram showing the entire structure of an editing apparatus according to the present invention.

The present invention is applied to, for example, an editing apparatus 100 of the configuration shown in FIG. 1. The editing apparatus 100 shown in FIG. 1 edits video signals conforming to the serial digital interface (SDI) of the specifications of SMPTE259M and is made up of a computer 10, a hard disc device 20 and a picture processing device 30, interconnected over a local bus BUS.

The computer 10 functions as a system controller for controlling the editing apparatus 100 in its entirety, and includes a central processing unit (CPU) 11, a random access memory (RAM) 13, a read-only memory (ROM) 12 and a monitor device 14, interconnected over an internal bus $BUS_{INT}$. To the internal bus $BUS_{INT}$ of the computer 10 are connected a keyboard 16 and a mouse 17 via an interface (I/F) 15.

The hard disc device 20 is used for temporarily storing picture signals pursuant to the serial digital interface (SDI) of the SMPTE259 specifications for editing on the editing apparatus 100, and is made up of a disc unit controller 21, to which the control command is accorded over the local bus BUS, and a hard disc array 22 controlled by the disc unit controller 21. This hard disc device 20 stores the 2-channel input signal on the hard disc array 22 to output a signal read out from the hard disc array 22 in three channels. As the two-channel input signals, there are source picture signals as the picture material for editing and processed signals outputted by the picture processing device 30. This hard disc device 20 stores the source picture signals and the processed picture signals outputted by the picture processing device 30 in the hard disc array 22 to control the hard disc array 22 by the hard disc array 22 to output three-channel picture signals from the hard disc array 22.

The picture processing device 30 is used for processing the picture signals edited by the present editing apparatus 100 with special picture effect processing or color correction processing and includes a picture processing unit controller 31 supplied with a control command over the local bus BUS, a cross-point switch 32 controlled by the picture processing unit controller 31, a special effect processor 33, a mixer 34 and a color correction unit 35.

In the picture processing device 30, the cross-point switch 32 is a matrix switcher having input lines with at least six channels and output lines with seven channels, and is designed so that six-channel signals, namely three-channel picture signals outputted by the hard disc device 20, two-channel picture signals outputted by the mixer 34, one-channel picture signals outputted by the color correction unit 35, are fed as input signals to the six-channel input lines. Of the six channels of the output lines of the cross-point switch 32, one channel is an output line of monitor picture signals, two channels are allocated as an output line for the processed picture signals, three channels are allocated as an output line to the special effect processor 33 and one channel is allocated as an output line to the color correction unit. The output line of the monitor picture signals is connected to the picture processing unit controller 31. This allows the picture processing unit controller 31 to send monitor picture signals from the output line over bus BUS to the monitor device 14 of the computer 10. The output line of two-channel processed picture signals is used as a downstream side recording device, not shown, while the remaining one output line is connected to the hard disc device 20. This allows the picture processing device 30 to send the processed picture signals over the output line to the hard disc device 20. Also, three-channel picture signals are sent to the special effect processor 33 via the three-channel output line connected to the special effect processor 33. Moreover, one-channel picture signals are sent to the color correction unit 35 via a one-channel output line connected to the color correction unit 35.

In addition, the special effect processor 33 processes the three-channel picture signals sent via the cross-point switch 32 with special effect processing to send the special-effect-processed picture signals from the mixer 34 to the input line of the cross-point switch 32.

The color correction unit 35 includes a demultiplexer DEMUX 36 fed via the cross-point switch 32 with the picture signals conforming to the serial digital data interface (SDI) of the SMPTE 259M specifications, a primary processing unit 37 fed with output signals of the primary processing unit 37, a secondary processing unit 38 fed with the output signal from the primary processing unit 37 and a multiplexer (MUX) 39 fed with output signals of the secondary processing unit 38.

The demultiplexer 36 of the color correction unit 35 converts the picture signals conforming to the serial digital data interface (SDI) of the SMPTE 259M specifications, entered via the cross-point switch 32, into luminance data Y and chroma data U, V. The primary processing unit 37 corrects the signal level of the picture signals, specifically, it corrects the luminance data Y and chroma data U, V from the multiplexer 36 mainly as to the signal level, such as white level, black level or gamma. The secondary processing unit 38 corrects the luminance data Y and the chroma data U, V processed by the primary processing unit 37 as to the signal level, mainly the color hue. The multiplexer 39 converts the luminance data Y and the chroma data U, V, processed by the primary processing unit 37 and the secondary processing unit 38, into picture signals conforming to the serial digital data interface (SDI) of the SMPTE 259M specifications to output the converted data.

Figure 2:
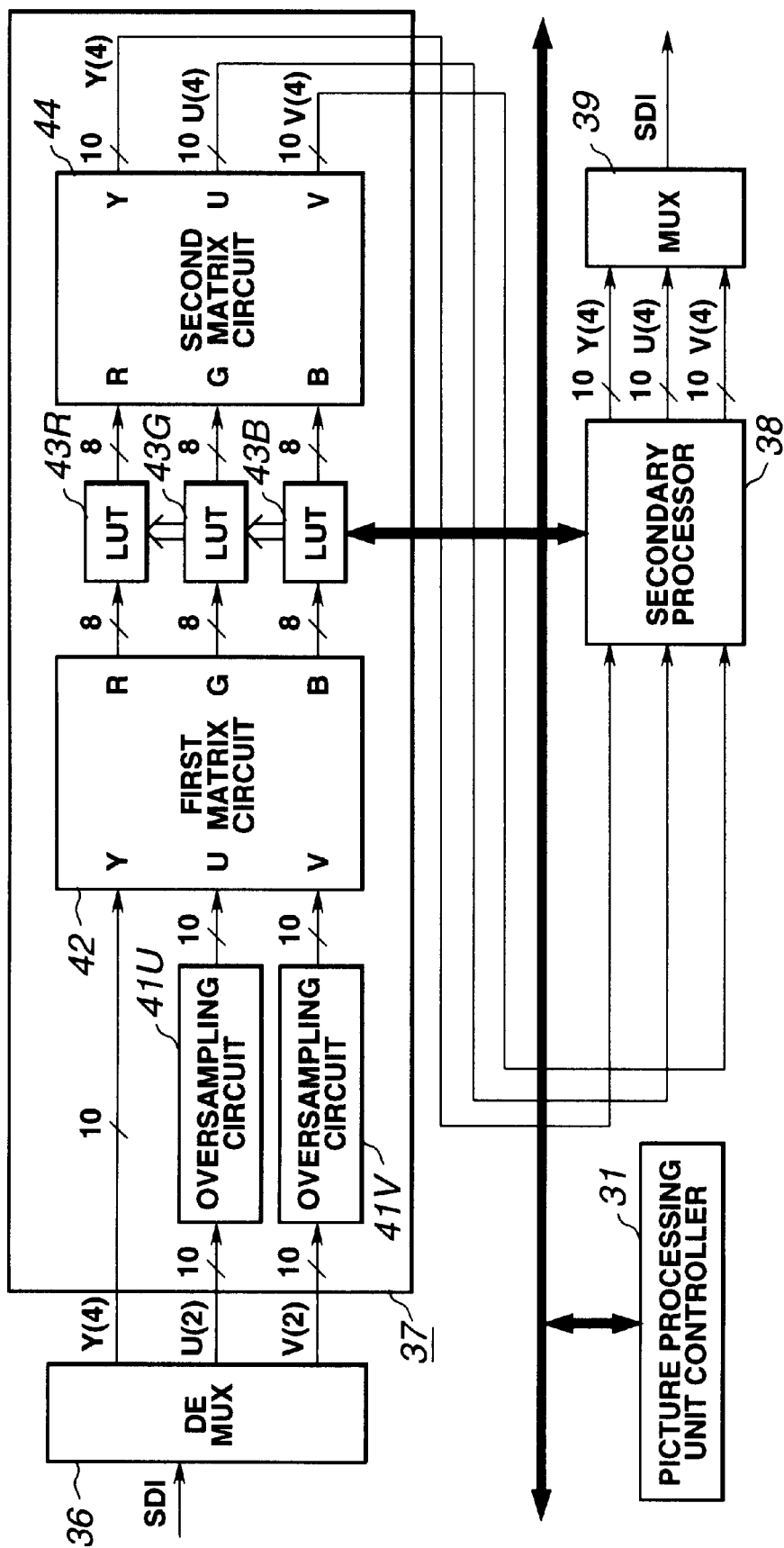
FIG. 2 is a block diagram showing a detailed structure of a primary processing unit of a picture processing device of the above editing apparatus.

The primary processing unit 37, the specified structure of which is shown in FIG. 2, is made up of oversampling circuits 41U, 41V, first matrix circuit 42, lookup tables 43R, 43G and 43B and a second matrix circuit 44.

The oversampling circuits 41U, 41V in the primary processing unit 37 oversamples the chroma data U, V from the demultiplexer 36 with the sampling frequency of the luminance data Y to synchronize the chroma data U, V with the luminance data Y to send the synchronized data to the first matrix circuit 42.

The first matrix circuit 42 is directly fed with the luminance data Y obtained from the demultiplexer 36, while being fed with the chroma data U, V synchronized with the luminance data Y. The first matrix circuit 42 performs matrix operations on the synchronized luminance data Y and chroma data U, V to transform the luminance data Y and the chroma data U, V, synchronized with each other, into red, green and blue data R, G and B.

The lookup tables 43R, 43G and 43 Bare formed by data of the output signal level for respective signal levels calculated by the CPU 11 of the computer 10 being previously supplied over the bus BUS to the picture processing unit controller 31 so as to be stored therein. These lookup tables 43R, 43G and 43B output color data R, G and B of the corresponding signal levels using the signal levels of the color data R, G and B. the lookup tables 43R, 43G and 43B perform calculations of $$OUT=((WL-BL)XIN)^{1/\gamma+BL} \quad (1)$$

on the color data R, G and B sequentially outputted by the first matrix circuit 42 in order to correct the signal levels of the color data R, G and B by a characteristic curve previously set by the operator.

In the above equation (1), IN, BL, IN, WL and γ denote the input level, output level for the input level, input data, black level, white level and the gamma correction value, respectively.

The second matrix circuit 44 performs matrix calculations on the color data R, G and B outputted by the lookup tables 43R, 43G and 43B to convert the color data R, G and B into luminance data Y and the chroma data U, V, which are outputted.

The CPU 11, provided on the computer 10, procures a working area in the RAM 13, and is responsive to actuations from the keyboard 16 or the mouse 17 to execute a series of processing operations stored in the ROM 12 or a hard disc device, not shown, to control the operation of the editing apparatus 100.

In the above control, if the operator designates processing of employing the color correction unit 35 of the picture processing device 30, the CPU 11 sends a control command to the picture processing unit controller 31 of the picture processing device 30 to start the operation of the color correction unit 35. If, in this state, the operator instructs the setting of the processing conditions, the CPU 11 accepts the processing conditions to execute the parameter setting processing for the color correction unit 35.

Figure 3A:
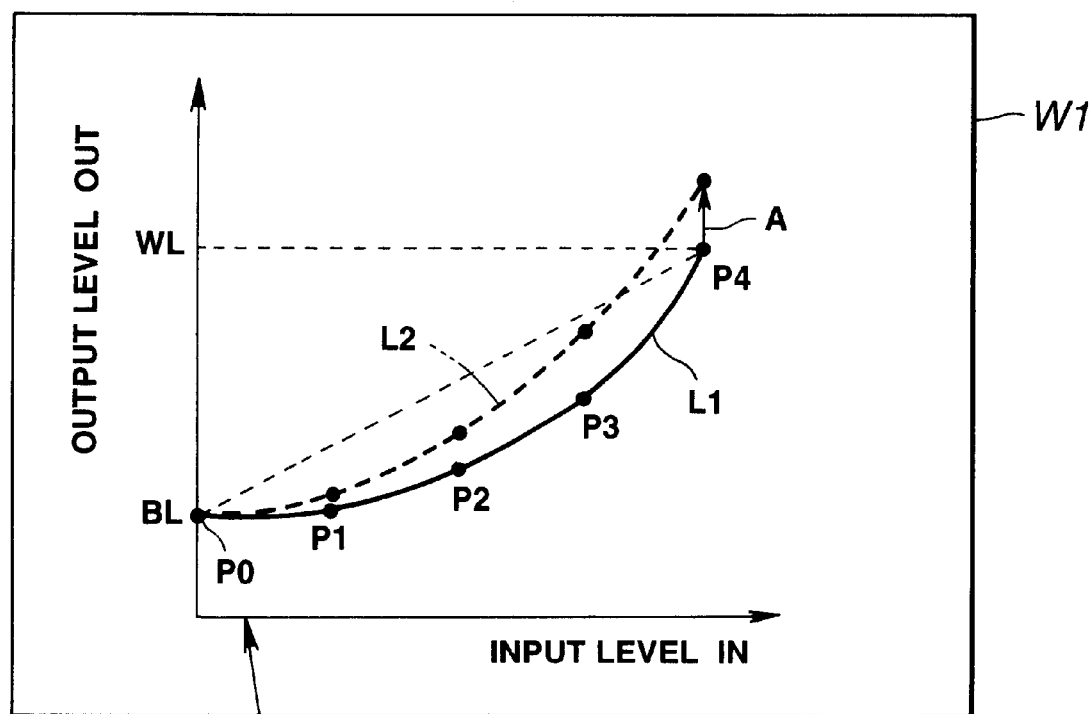
FIGS. 3A and 3Bare diagrammatic views for illustrating the setting of the primary setting unit.

At this time, the CPU 11 accepts the setting of the processing conditions by the graphical user interface (GUI) displayed on the monitor device 14. That is, if the menu for condition setting concerning the white level, black level or gamma correction of the primary processing is selected, the CPU 11 displays a characteristic curve L1 indicating the relation between the input signal level IN and the output signal level OUT of the red, green and blue signals, as shown in FIG. 3A. Meanwhile, there is shown in FIG. 3A only a characteristic curve L1 for the I color signal, with the other color signals not being shown.

The CPU 11 allows plural dots P0, P1, . . . to be indicated at a pre-set interval on this characteristic curve L1, in which the beginning point P0 and the terminal point P4 denote the black level BL and the white level W1, with the curvature of the curve denoting gamma γ.

The CPU 11 is responsive to the actuation by the operator to execute the calculations of the equation (1) by the default values or values stored in pre-set memory means of the black level BL, white level W1 and γ in order to calculate the output level OUT for the input level IN sequentially to display the characteristic curve L1 based on the results of the calculations.

If, in this state, the operator grasps the beginning point P0 or the terminal point P4 by the mouse 17 to move the point, the calculations of the equation (1) are executed on the basis of the coordinate values of the moved beginning point P0 or the terminal point P4 to accept in this manner the modification of the black level BL and the white level W1, at the same time as the characteristic curve by the modified black level BL and the white level W1 are displayed. If the operator grasps intermediate points P1, P2 or P3 to move the point, the calculations of the equation (1) are executed on the basis of the coordinate values of the moved points P1, P2 or P3, beginning point P0 and the terminal point P4 to accept modification of the gamma γ, at the same time as the characteristic curve by this gamma γ are displayed.

This allows the CPU 11 to set input/output characteristics variably responsive to the actuation by the operator. The CPU 11 can form a display picture so as to accept numerical inputs for alternative values of the black level BL, white level W1 and gamma γ to modify the display of the characteristic curve by these numerical inputs.

The CPU 11 sequentially calculates the output signal level sequentially for the signal level that can be assumed by the picture signals by the black level BL accepted in this manner. At this time, the CPU 11 allocates data of 8 bits to the input level IN for the color signals of red, green and blue, while sequentially switching the 8-bit input level IN to execute the calculations of the equation (1) to calculate the output level OUT by 8-bit data associated with the input level IN.

The CPU 11 sends the results of calculations to the picture processing unit controller 31 of the picture processing device 30 to set the results therein to formulate the lookup tables 43R, 43G and 43Bin the primary processing unit 37 based on the so-set input/output characteristics. The CPU 11 also uses the so-set lookup tables 43R, 43G and 43Bin order to process the picture by the above color correction unit 35.

Figure 3B:
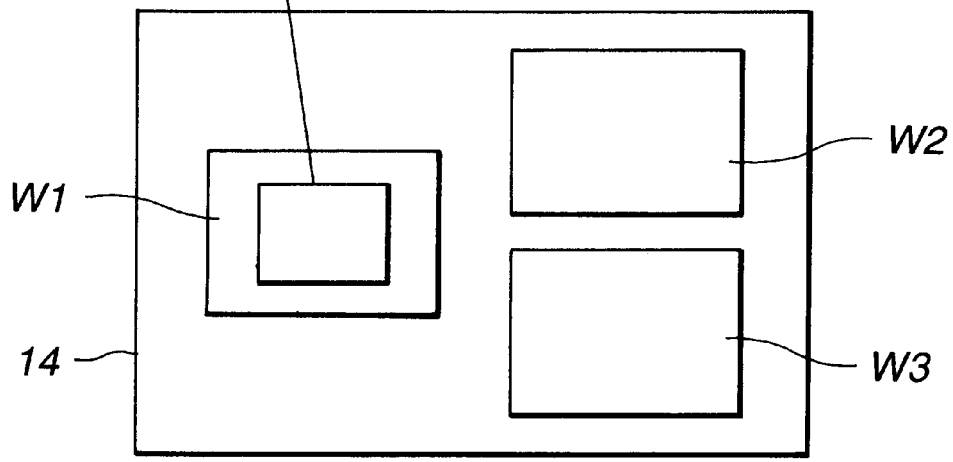

In setting the above input/output characteristics, the CPU 11 forms the window W1 to display the characteristic curve L1, as shown in FIG. 3B, while displaying pictures before and after processing under conditions as set by the operator on the other windows W1 and W2.

The CPU 11 is then responsive to the actuation by the operator to switch the display of the characteristic curve 12 in order to repeat the setting of the lookup tables 43R, 43G and 43B of the primary processing unit 37. Thus, the operator can interactively modify the conditions of primary processing as he or she checks the processing results on the monitor device 14 by actuating the mouse 17.

Figure 4:
FIG. 4 is a photo showing an example of a source video image for primary processing by the above primary processing unit.
Figure 5:
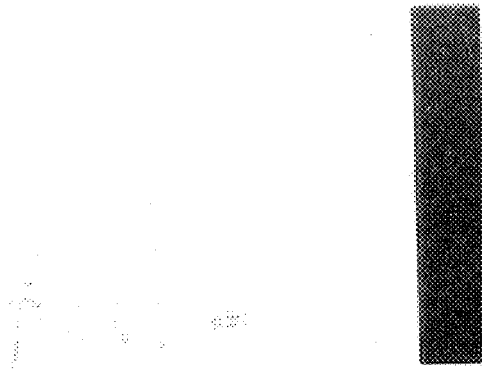
FIG. 5 is a photo showing the results of primary processing by the primary processing unit by setting the gamma value to 2.51 for the source video image shown in FIG. 4.
Figure 6:
FIG. 6 is a photo showing the results of primary processing by the primary processing unit by setting the gamma value to 0.79 for the source video image shown in FIG. 4.
Figure 7:
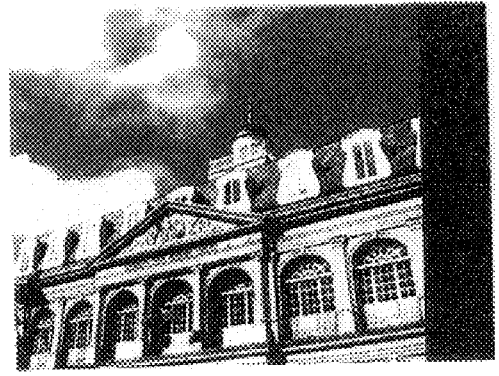
FIG. 7 is a photo showing the results of primary processing by the primary processing unit by setting the gamma value to 0.32 for the source video image shown in FIG. 4.

FIG. 5 shows the results of primary processing by the primary processing unit 37 of the color correction unit 35 on the over-iris source video image as shown in FIG. 4, with the gamma value set to 2.51. FIGS. 6 and 7 show the same results with the gamma value being set to 0.79 and 0.32, respectively. For the source video image shown in FIG. 4, over-iris state processing results, optimum iris state processing results and low iris state processing results were obtained by the primary processing with the gamma values of 2.51, 0.79 and 0.32, respectively. Thus, the gamma value can be freely set by the primary processing unit 37 of the color correction unit 35 in order to obtain spontaneous processing results.

Figure 8:
FIG. 8 is a photo showing the results of primary processing by the primary processing unit by setting the white level to 127 gradations for the source video image shown in FIG. 4.
Figure 9:
FIG. 9 is a photo showing the results of primary processing by the primary processing unit by setting the black level to 127 gradations for the source video image shown in FIG. 4.
Figure 10:
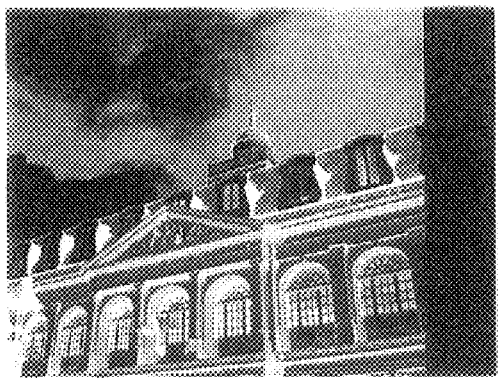
FIG. 10 is a photo showing the results of primary processing by the primary processing unit by setting the white level and the black level to 0 gradation and to 255 gradations for the source video image shown in FIG. 4.
Figure 11:
FIG. 11 is a photo showing the results of primary processing by the primary processing unit by setting the white level and the black level to 0 gradation only for red data for the source video image shown in FIG. 4.

Also, for the source video image shown in FIG. 4, the results of primary processing with the white level being set to 127 gradations are shown in FIG. 9, while those with the white level and the black level being set to 0 and 255 gradations, respectively, are shown in FIG. 10. The results by primary processing in which the white level and the black level are set to the 0 gradation only for red data are shown in FIG. 11. As may be seen from FIGS. 8 to 10, it is possible with the primary processing unit 37 of the color correction unit 35 to correct the signal level by changing the gradation significantly without raising any inconvenience such as picture quality deterioration. As may be seen from FIG. 11, it is also possible with the primary processing unit 37 of the color correction unit 35 to obtain red color extinguishing effect.

Figure 12:
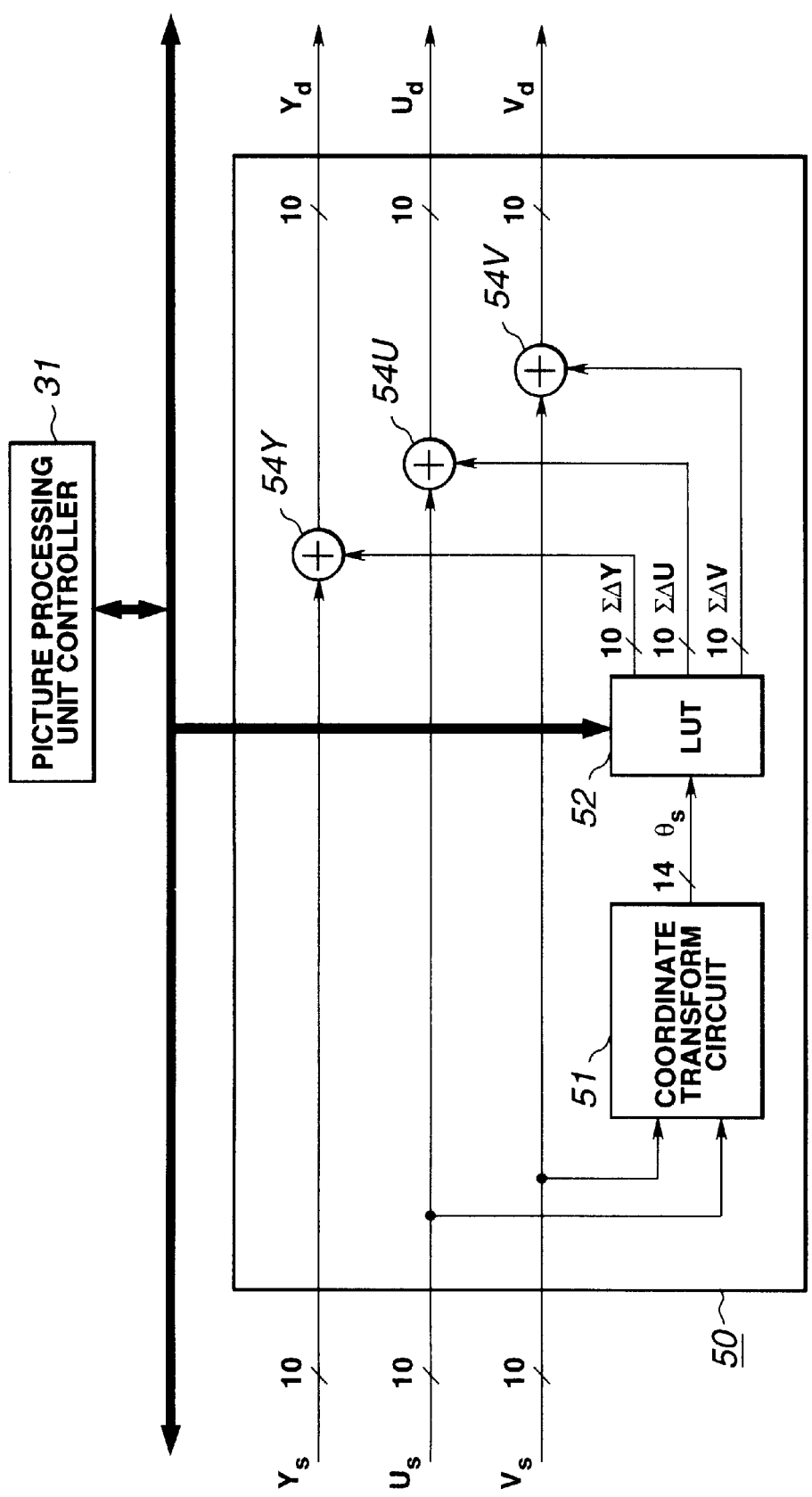
FIG. 12 is a block diagram showing a specified structure of a secondary processing unit in the picture processing device of the editing apparatus.

Also, with the present editing apparatus 100, a secondary processing unit 50, made up of a coordinate transformation circuit 51, a lookup table 52 and addition circuits 54Y, 54U and 54V, a specified structure of which is shown in FIG. 12, is used as the secondary processing unit 38.

In the secondary processing unit 50, the coordinate transformation circuit 51 is fed with chroma data U, V, outputted by the primary processing unit 37. This coordinate transformation circuit 51 executes calculations of $$\theta = \arctan(V/U) \quad (2)$$

on the sequentially entered chroma data U and V in order to convert the chroma data U, V to data having the color hue θ.

The lookup table 52 is a memory for storage of comprehensive correction value data ΣΔY, ΣΔU ΣΔV associated with each value of θ, such that $0 \leq ° \leq \theta \leq 360°$, previously calculated by the PU 11 of the computer 10. This lookup table 52 outputs the comprehensive correction value data ΣΔY, ΣΔU ΣΔV of the source vector using data of the color hue θ obtained by the coordinate transformation circuit 51 as addresses.

The addition circuits 54Y, 54U and 54V add the comprehensive correction value data ΣΔY, ΣΔU ΣΔV read out from the lookup table 52 to the luminance data $Y_s$ and to the chroma data $U_s$, $V_s$ of the source color outputted by the primary processing unit 37 to generate luminance data Y and the chroma data U, V of the destination color.

The principle of the correction processing in the secondary processing unit 50, configured as shown in FIG. 12, is explained.

The correction processing in the secondary processing unit 50 adopts the system of adding the comprehensive correction value data ΣΔY, ΣΔU ΣΔV, calculated in association with the color hue ($0° \leq \theta \leq 360°$) of the input signals U and V to the input signals $Y_s$, $U_s$ and $V_s$. The relation between the inputs ($Y_S$, $U_s$, $V_s$) and the outputs ($Y_d$, $U_d$, $V_d$) is shown as $$Y_d = Y_s + \Sigma \Delta Y$$

$$U_d = U_s + \Sigma \Delta U$$

$$V_d = V_s + \Sigma \Delta V \quad (3)$$

wherein Ys, Us and Vs are the luminance level and chroma levels of the source vector, respectively, while $Y_d$, $U_d$ and $V_d$ are luminance level and chroma levels of the destination vector, respectively.

The comprehensive correction value data ΣΔY, ΣΔU ΣΔV are now explained. The color correction device of the present invention is configured for setting not only the sole source vector but also an optional number of 1 to n of source vectors and an optional number n of destination vectors associated with these n source vectors. Thus, the sum of correction data $\Delta Y_1$ to $\Delta Y_n$ of luminance components associated with the first to nth source vectors is defined as the comprehensive correction data ΣΔY for the luminance component, while the sum of the correction data ΔU1 to ΔUn of the color components associated with the first to nth source vectors is defined as the comprehensive correction data ΣΔU for the color component associated with the first to nth source vectors ΣΔU and the sum of the correction data ΔV1 to ΔVn of the color components associated with the first to n'th source vectors is defined as the comprehensive correction data ΣΔ1 to ΣΔn for the color component associated with the first to n'th source vectors ΣΔV.

Thus, the relation of the individual correction data and the comprehensive correction data may be represented by $$\Delta Y = \Delta Y_1 + \Delta Y_2 + \ldots + \Delta Y_n$$

$$\Delta U = \Delta U_1 + \Delta U_2 + \ldots + \Delta U_n$$

$$\Delta V = \Delta V_1 + \Delta V_2 + \ldots + \Delta V_n \quad (4)$$

First, for finding the comprehensive correction data ΣΔY concerning the luminance components, attention is directed to the luminance component $Y_s$ of the source vector and the luminance component Yd of the first destination vector associated with the source vector.

Of the n vectors as set by the operator, the luminance component of the first source vector is $Y_{s1}$ and the first destination vector is $Y_{d1}$. Also, correction data for correcting the luminance component of the first destination vector to the luminance component of the first destination vector is $\Delta Y_1$ and an optional weighting function set for this first source vector is $K_1(\theta)$. In this case, the relation among $Y_{s1}$, $Y_{d1}$, $\Delta Y_1$ and $K_1(\theta)$ is represented by $$\Delta Y_1 = K_1(\theta) X (Y_{d1} - Y_{s1}) \tag{5}$$

This weighting function $K_1(\theta)$ will be explained in detail subsequently.

Since the color correction apparatus of the present invention is configured for setting n source vectors and destination vectors, as described above, it is seen that the following relation:

$$\Delta Y_1 = K_1(\theta) X (Y_{d1} - Y_{s1})$$

$$\Delta Y_2 = K_2(\theta) X (Y_{d2} - Y_{s2})$$

$$\Delta Y_3 = K_3(\theta) X (Y_{d3} - Y_{s3})$$

$$\Delta Y_n = K_n(\theta) X (Y_{dn} - Y_{sn}) \tag{6}$$

holds for all source vectors and destination vectors up to nth ones on the assumption that the equation (5) used for finding the correction data $\Delta Y_1$ concerning the first source vector is applicable.

Thus, by substituting $\Delta Y_1$ to $\Delta Y_{1n}$ into the equation (4), we obtain:

$$\sum \Delta Y = \Delta Y_1 + \Delta Y_2 + \cdots + \Delta Y_n \tag{7}$$
$$= K_1(\theta) \times (Y_{d1} - Y_{s1}) + K_2(\theta) \times (Y_{d2} - Y_{s2}) +$$
$$\cdots + K_n(\theta) \times (Y_{dn} - Y_{sn})$$

If, for finding the comprehensive correction data $\Sigma \Delta U$, $\Sigma \Delta V$ for color components U and V as in the calculations of finding the equation (7) for luminance components, attention is directed to the color components $U_s$, $V_s$ of the source vector and to the color components $U_d$, $V_d$ of the destination vector, the following equations:

$$\sum \Delta U = \Delta U_1 + \Delta U_2 + \cdots + \Delta U_n \tag{8}$$
$$= K_1(\theta) \times (U_{d1} - U_{s1}) + K_2(\theta) \times (U_{d2} - U_{s2}) +$$
$$\cdots + K_n(\theta) \times (U_{dn} - U_{sn}) \text{ and}$$

$$\sum \Delta V = \Delta V_1 + \Delta V_2 + \cdots + \Delta V_n \tag{9}$$
$$= K_1(\theta) \times (V_{d1} - V_{s1}) + K_2(\theta) \times (V_{d2} - V_{s2}) +$$
$$\cdots + K_n(\theta) \times (V_{dn} - V_{sn})$$

hold as does the equation (7).

Based on the equations (7) to (9), the CPU 11 calculates the comprehensive correction data $\Sigma \Delta$, $\Sigma \Delta U$ and $\Sigma \Delta V$ for $\theta$ having the values of from 0° to 360° at an interval of 1°. That is, 360 comprehensive correction data $\Sigma \Delta Y$, $\Sigma \Delta U$ and $\Sigma \Delta V$ for all values of the angle are generated. These calculated comprehensive correction data $\Sigma \Delta Y$, $\Sigma \Delta U$ and $\Sigma \Delta V$ are stored in the lookup table 52 so as to be addressed for each angular value of $\theta$.

The above-described weighting function $K(\theta)$ is now explained. This weighting function $K(\theta)$ is a function for setting the gain of the correction value for each source vector. Similarly to the above-mentioned correction data, the weighting function $K(\theta)$ is set for each source vector. Thus, there are first to n'th weighting functions $K_1(\theta)$ to $K_n(\theta)$ if the first to nth source vector are set.

As parameters of the weighting function $K(\theta)$, color hue range data W and gain level data G specifying the weighting range are set. The weighting function $K(\theta)$ is determined responsive to the set color hue range data and gain level.

Figure 13A:
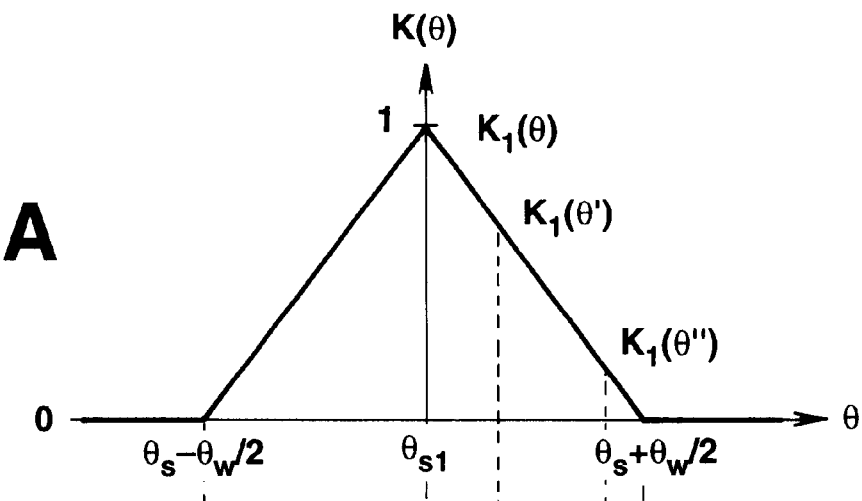
FIGS. 13A and 13Bare graphs for illustrating the weighting function in the secondary processing by the secondary processing unit.
Figure 13B:
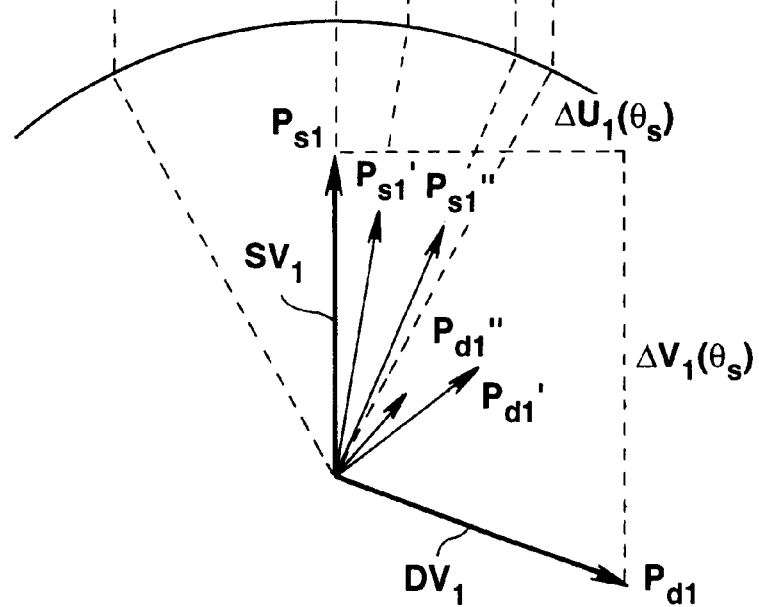

Referring to FIGS. 13A and 13B, the setting of the first weighting function K1($\theta$) set for the first source vector is taken for example. FIG. 13B represents the color space by a two-dimensional color space. The example of FIG. 13B illustrates conversion of the color of a point $P_{s1}$ represented by the first source vector $SV_1$ by the first destination vector $DV_1$.

As also shown in FIG. 13A, the color hue range data $\theta_w$ is data set about the color hue angle $\theta_{s1}$ of the first source vector $SV_1$ as center. The first weighting function $K(\theta)$ is such a function in which the gain is 1 or 0 for the color hue angle $\theta_{s1}$ of the first source vector and for the color hue angles $\theta_{s1} - \theta_w/2$ and $\theta_{s1} + \theta_w/2$, respectively.

Specifically, for the range of $\theta_{s1} - \theta_w/2 \leq \theta < \theta_{s1}$, this function $K_1(\theta)$ is given by $$K(\theta) = \frac{\theta - \theta s1 + \theta w/2}{\theta w/2} \times G \tag{10}$$

whereas, for a range of $\theta_{s1} \leq \theta + \theta_w/2$, it is given by $$K(\theta) = \frac{\theta s1 - \theta + \theta w/2}{\theta w/2} \times G \tag{11}$$

On the other hand, for a range of $\theta > \theta_{s1} - \theta_w/2$ and for a range of $\theta_{s1} + \theta_w/2 < \theta$, it is given by $$K(\theta) = 0 \tag{12}$$

How the color is changed with the use of the first weighting function is explained with reference to FIGS. 13A and 13B.

FIG. 13 shows how the color of a point Ps1 represented by a first source vector $SV_1$ is converted into the color of a point $P_{d1}$ represented by a first destination vector $DV_1$, how the color of a point $P_{s1}'$ in the vicinity of the first source vector $SV_1$ in the color hue range data $\theta_w$ as set is converted to a point $P_{d1}'$ and how the color of a point $P_{s1}''$ remote from the first source vector $SV_1$ is converted into a point $P_{d1}''$.

The coordinates of the respective points may be represented by $P_{s1}(Y_{s1}, U_{s1}, V_{s1})$ $P_{d1}(Y_{s1} + \Delta Y_1(\theta_s),$ $U_{s1} + \Delta U_1(\theta_s),$ $V_{s1} + \Delta V_1(\theta_s) \tag{13}$ $P_{s1}'(Y_{s1}', U_{s1}', V_{s1}')$ $P_{d1}'(Y_{s1} + K(\theta') X \Delta Y_1(\theta_s),$ $Us1' + K(\theta') X \Delta U_1(\theta_s),$ $Vs1' + K(\theta') X \Delta V_1(\theta_s) \tag{14}$ $P_{s1}''(Y_{s1}'', U_{s1}'', V_{s1}'')$ $P_{d1}''(Y_{s1}'' + K(\theta'') X \Delta Y_1(\theta_s),$ $$U_{s1}''+K(\theta'')X\Delta U_1(\theta_s),$$
$$V_{s1}''+K(\theta'')X\Delta V_1(\theta_s) \quad (15)$$

As may be seen from FIG. 13A, the closer the point $P_{s1}''$ to the first source vector $SV_1$, the larger is the value of the weighting function $K(\theta')$. As may also be seen from the equation (14), the position of the point $P_{d1}'$ of the destination of conversion is determined by the correction data $\Delta Y_1(\theta_s)$ from the source vector to the destination vector multiplied by the weighting functions $K(\theta')$. That is, the closer the point $P_{s1}'$ to the first source vector $SV_1$, the closer is the point $P_{d1}'$ of the destination of conversion of the pre-conversion point $P_{s1}'$ to the destination vector.

The result is that the color conversion is possible not only for the pixels having colors on the source vector but also for the pixels having the color of the neighborhood of the source vector. Also, since the present color correction device uses the weighting function $K(\theta)$ having the color hue s the function, the point $P_{d1}'$ of the destination of conversion is not converted to the color of the point $P_{s1}'$ close to the source vector but is converted to the color intermediate between the color on the destination vector and the color of the pre-conversion point $P_{s1}'$, in the case of conversion of the color of the point $P_{s1}'$ close to the source vector, thus realizing more spontaneous color conversion.

Conversely, as may be seen from FIG. 13A, the further the point $P_{s1}''$ from the first source vector, the smaller becomes the value of the weighting function $K(\theta'')$. As may also be seen from the above equation (15), the position of the point $P_{d1}'$ of the destination of conversion is determined by the correction data from the source vector to the destination vector multiplied by this weighting function ($\theta''$). Therefore, the further the point $P_{s1}''$ is from the first source vector $SV_1$, that is the further $\theta''$ is from $\theta_s$, the closer is the point of the destination of conversion $P_{d1}''$ to the pre-conversion point $P_{s1}''$.

That is, the fact that the point of the destination of conversion $p_{d1}''$ is closer to the pre-conversion point $P_{d1}''$ means that the color of the point $P_{s1}''$ is not significantly changed by color correction. Therefore, with the present color correction device, the color of the point $P_{s1}''$ remote from the source vector is converted to the color of the point $P_{d1}''$ close to this point itself, in converting the color of the point $P_{s1}''$, thus realizing more spontaneous color conversion.

Figure 14A:
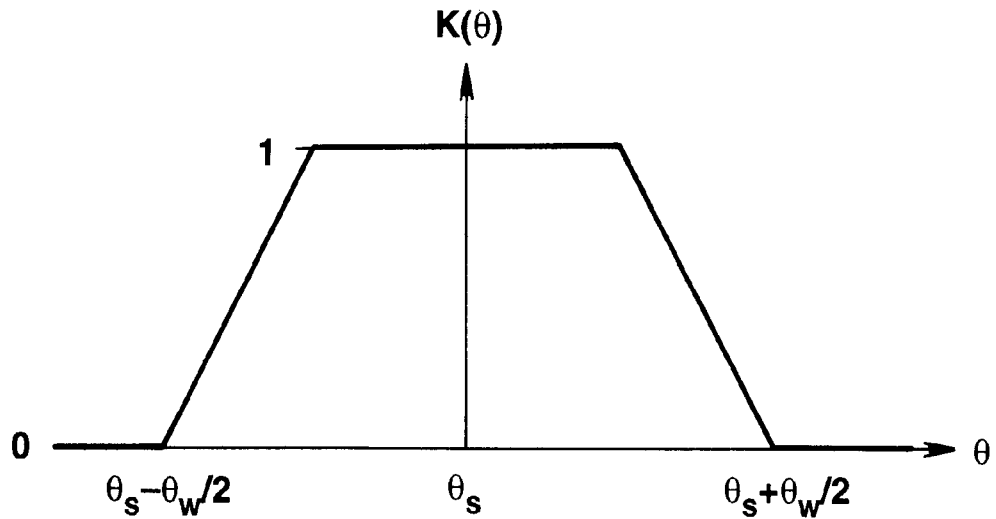
FIGS. 14A and 14B are diagrammatic views showing the relation between the weighting function and the amount of correction in the above secondary processing.
Figure 14B:
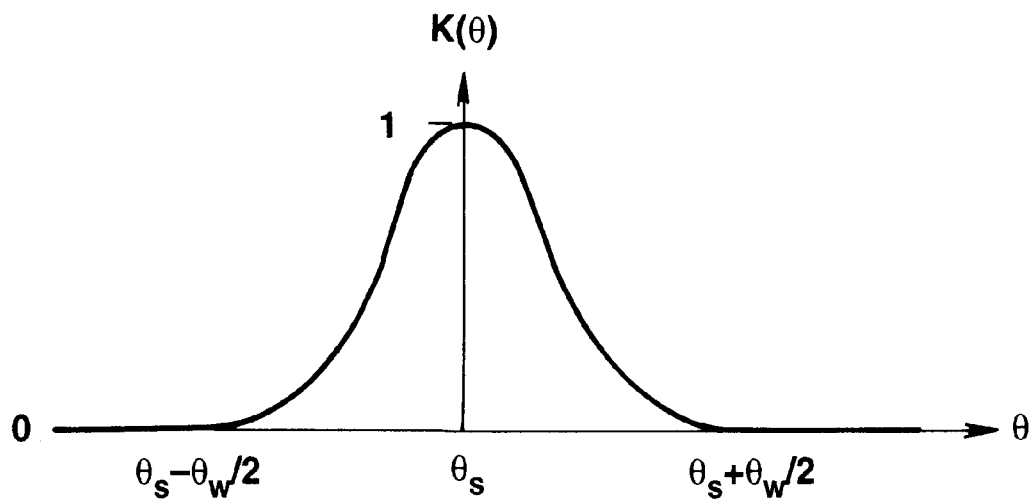

The weighting function $K(\theta)$ is not limited to the functions shown in FIG. 13A but those shown in FIGS. 14A and 14B can be used depending on the pictures for conversion.

Figure 15:
FIG. 15 is a photo showing an example of a source video image processed by secondary processing unit with secondary processing.
Figure 16:
FIG. 16 is a photo showing the results of secondary processing by the secondary processing unit for the source video image shown in FIG. 15 by designating the color hue of 115° (luminance level of 107 gradations) for the source vector and by setting the color hue of 87° for the destination vector, with the saturation degree of 71, for the source video image shown in FIG. 15.
Figure 17:
FIG. 17 is a photo showing the results of secondary processing by the secondary processing unit by setting the color hue of 308° for the destination vector for the source video image shown in FIG. 15.
Figure 18:
FIG. 18 is a photo showing the results of secondary processing by the secondary processing unit by setting the color hue of 222° for the destination vector for the source video image shown in FIG. 15.

FIG. 16 show the results of secondary processing of the source video image shown in FIG. 15 by a secondary processor 50 of FIG. 12, used as a secondary processor 38 of the color correction unit 35, with the saturation degree 71 and the color hue 115° (107 gradations of the luminance level) being designated for the source vector and with the color hue of 87° being designated for the destination vector. On the other hand, FIG. 17 shows the results of secondary processing with the color hue of 308° being designated for the destination vector and FIG. 18 shows the results of secondary processing with the color hue of 222° being set for the destination vector. As may be seen from FIGS. 15 to 18, it is possible for the secondary processor 50 to change the color hue significantly without being accompanied by unintended changes in the color hue.

As the secondary processor 38 of the color correction unit 35 in the picture processing device 30, a color correction unit 60, configured as shown in FIG. 19, may be used in place of the color correction unit 50 configured as shown in FIG. 12.

This secondary processor 60, shown in FIG. 19, is made up of a coordinate conversion circuit 61, first and second lookup tables 62, 63, first to fourth multiplication circuits 64 to 67 and an addition circuit 68.

In the secondary processor 60, the coordinate conversion circuit 51 is fed with chroma data U, V outputted by the primary processing unit 37. The coordinate conversion circuit 37 performs computational processing $$\theta = \arctan(V/U)$$
$$r = U/\cos\theta = (U^2+V^2)^{1/2} \quad (16)$$

on the sequentially entered chroma data U and V to convert the chroma data U, V into data of the color hue $\theta$ and the saturation degree r. Thus, the secondary processor 60 represents the sequentially entered picture signals by the polar coordinate system on the color plane. At this time, the first coordinate conversion circuit 61 generates, from the chroma data U, V, each of 10 bits, data of the color hue $\theta$ of 14 bits and data of the saturation degree r of 11 bits. This procures subsequent resolution for the next following processing. The data of the color hue $\theta$ and data of the saturation degree r, generated by the coordinate conversion circuit 61, are sent to the lookup tables 62, 63 and to the first multiplication circuit 64, respectively.

The first lookup table 62 is formed by previously storing comprehensive correction data $\Sigma\Delta R$, $\Sigma\Delta X$ and $\Sigma\Delta Y$, computed by the CPU 11 of the computer 10, and outputs corresponding comprehensive correction data $\Sigma\Delta R$, $\Sigma\Delta X$ and $\Sigma\Delta Y$ to the first to third multiplication circuits 64 to 66, using the color hue $\theta$, generated by calculations by the coordinate conversion circuit 61, as addresses.

The first multiplication circuit 64 multiplies the saturation degree r computed by the coordinate conversion circuit 61 with correction data $\Delta R$ to supply the multiplied output to the second and third multiplication circuits 65, 66.

The second multiplication circuit 65 multiplied the correction data $\Delta X$, comprised of U-axis component of the vector of the color hue $\theta$ outputted by the first lookup table 62, with the saturation degree r outputted by the first multiplication circuit 64. The first multiplication circuit 66 multiplies the correction data $\Delta Y$, comprised of V-axis component of the vector of the color hue $\theta$ outputted by the first lookup table 62, with the saturation degree r outputted by the first multiplication circuit 64. Thus, the second and third multiplication circuits 65, 66 output the multiplication outputs as color data $U_d$, $V_d$ of the destination vector.

The second lookup table 63 is formed by previously storing the comprehensive gain $\Sigma\Delta GAIN$ and the offset $\Sigma\Delta OFF$ of the luminance level for each color hue $\theta$ computed by the CPU 11, and outputs the $\Sigma\Delta GAIN$ and the offset $\Sigma\Delta OFF$ to the fourth multiplication circuit 67 and to the addition circuit 68 using color hue $\theta$ outputted by the first coordinate conversion circuit 61 as the address.

The fourth multiplication circuit 67 multiplies the luminance data Y, sequentially entered from the primary processing unit 37, with the gain $\Sigma\Delta GAIN$ supplied from the second lookup table 63, to send the multiplication output to the addition circuit 68.

The addition circuit 68 adds the offset $\Sigma\Delta OFF$ to output data of the fourth multiplication circuit 67 to output the resulting data. That is, the fourth multiplication circuit 67 and the addition circuit 68 execute the computational processing $$Y_d = \Sigma\Delta GAIN X Y_s + \Sigma\Delta OFF \quad (17)$$

in order to correct the luminance level by characteristics as set by the operator.

The comprehensive correction data ΣΔU, ΣΔV and ΣΔR are now explained. As explained with reference to FIG. 12, the color correction device of the present invention is designed for setting not only a sole source vector but also an optional number of 1 to n of source vectors and an optional number n of destination vectors associated with these n source vectors. Thus, the comprehensive correction data, obtained by the correction data $\Delta U_1$ to $\Delta U_n$ of the U-axis components associated with the first to n'th source vectors, are defined as ΣΔU, while the comprehensive correction data, obtained by the correction data $\Delta V_1$ to $\Delta V_n$ of the V-axis components associated with the first to n'th source vectors, are defined as ΣΔV and the comprehensive correction data, obtained by the correction data $\Delta R_1$ to $\Delta R_n$ along the saturation degree direction associated with the first to n'th source vectors, are defined as ΣΔR.

Also, the secondary processor shown in FIG. 19 performs color correction processing using polar coordinates instead of UV coordinates. If the conversion data for converting the color hue angle of the first to n'th source vectors to the color hue angle of the first to n'th destination vectors are defined as $\Delta\theta_1$ to $\Delta\theta_n$, and the comprehensive correction data concerning the color hue angle associated with the first to n'th source vectors is ΣΔθ, we obtain $$\Sigma\Delta\theta = \Delta\theta_1 + \Delta\theta_2 + \ldots + \Delta\theta_n$$

$$\Sigma\Delta R = \Delta R_1 \Delta R_1 + \ldots + \Delta R_n \quad (18)$$

Then, in order to find the comprehensive correction data ΣΔθ concerning the color hue angle, the color hue of the first source vector $SV_1$ as set by the operator is $\theta_{s1}$ and the color hue angle of the first destination vector $DV_1$ set in association with the first source vector $SV_1$ is $\theta_{D1}$. The weighting function set for the first source vector $SV_1$ is $K_1(\theta)$. Thus, the correction data $\Delta\theta_1$ for the color hue for changing the color of the pixel in the vicinity of the first source vector $SV_1$ to that of the pixel in the vicinity of the first destination vector $DV_1$ may be represented by the equation $$\Delta\theta_1 = (\theta_{D1} - \theta_{s1}) X K_1(\theta) \quad (19)$$

Also, as explained in the equation (6), the color correction device of the present invention is configured for setting an optional number n of source vectors. Thus, if the first to n'th source vectors are set, we obtain:

$$\Delta\theta_1 = (\theta_{D1} - \theta_{S1}) X K_1(\theta)$$

$$\Delta\theta_2 = (\theta^{D2} - \theta_{S2}) X K_2(\theta)$$

$$\Delta\theta_n = (\theta_{Dn} - \theta_{Sn}) X K_n(\theta) \quad (20)$$

Therefore, by substituting $\Delta\theta_1$ to $\Delta\theta_n$ of the equation (20) into the equation (18), we obtain:

$$\sum \Delta\theta = \Delta\theta_1 + \Delta\theta_2 + \cdots + \Delta\theta_n \quad (21)$$
$$= (\theta_{D1} - \theta_{S1}) \times K_1\theta +$$
$$(\theta_{D2} - \theta_{S2}) \times K_2\theta + \cdots + (\theta_{Dn} - \theta_{Sn}) \times K_n\theta$$

Since the comprehensive correction data ΣΔθ is data of the polar coordinate system in the UV space, this data needs to be converted to data of the rectangular coordinate system in this UV space. Thus, if data in the U-axis direction and that in the V-axis direction, represented by the rectangular coordinate system in the UV space, are ΔU and ΔV, respectively, we obtain:

$$\Delta X = \cos(\theta + \sum \Delta\theta) \quad (22)$$
$$= \cos(\theta + (\theta_{D1} - \theta_{S1}) \times K_1(\theta) +$$
$$(\theta_{D2} - \theta_{S2}) \times K_2(\theta) + \cdots + (\theta_{Dn} - \theta_{Sn}) \times K_n(\theta)$$

$$\Delta Y = \sin(\theta + \sum \Delta\theta)$$
$$= \sin(\theta + (\theta_{D1} - \theta_{S1}) \times K_1(\theta) +$$
$$(\theta_{D2} - \theta_{S2}) \times K_2(\theta) + \cdots + (\theta_{Dn} - \theta_{Sn}) \times K_n(\theta)$$

Figure 20A:
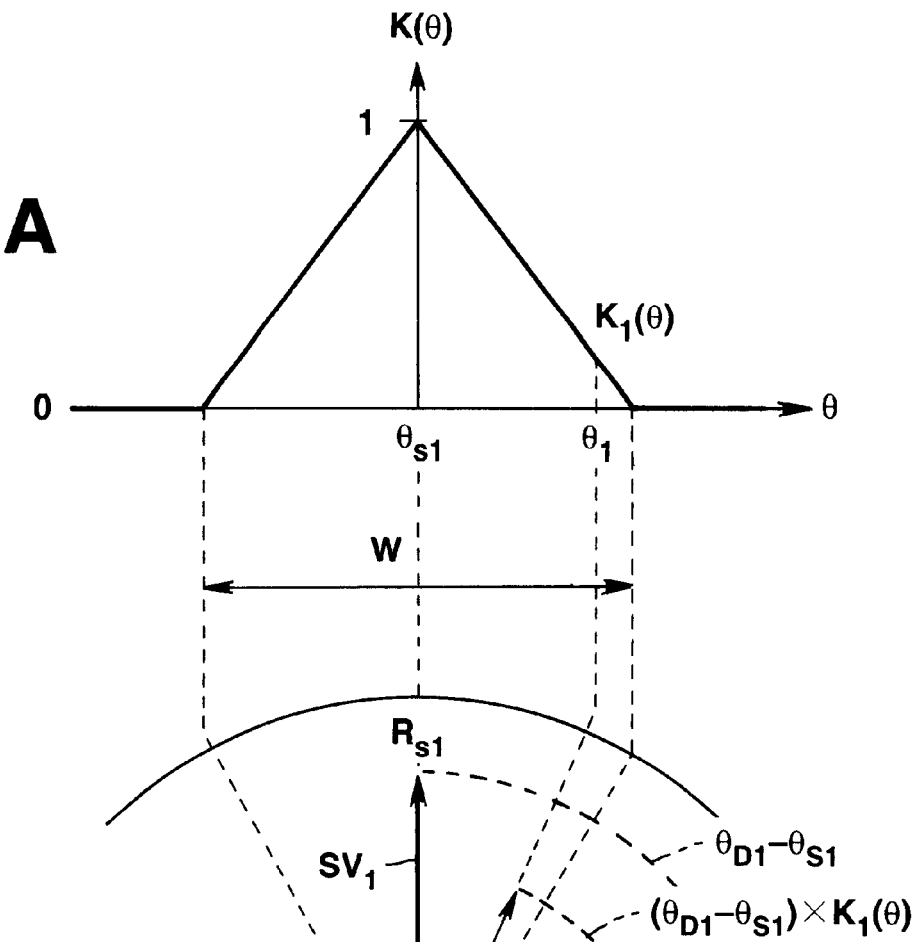
FIGS. 20A and 20Bare graphs for illustrating the weighting function in the secondary processing by the secondary processing unit shown in FIG. 19.
Figure 20B:
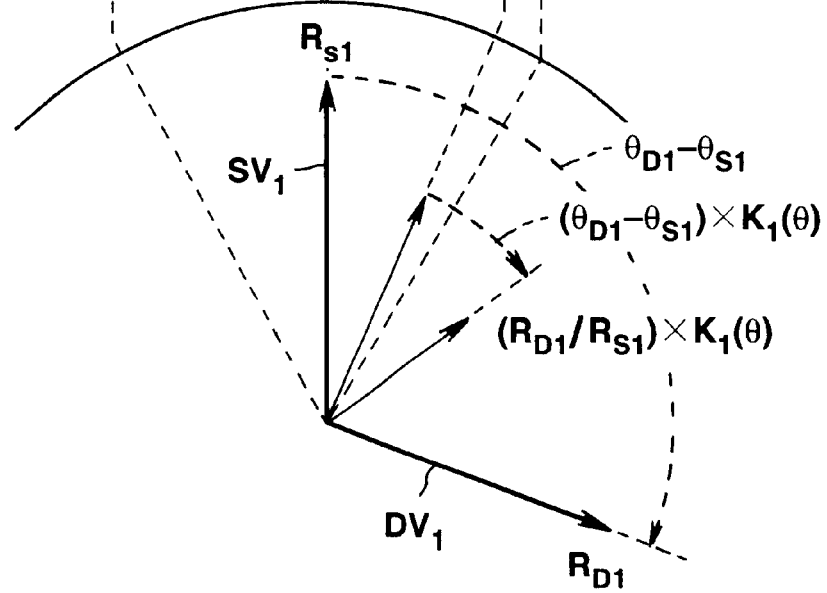
Figure 21:
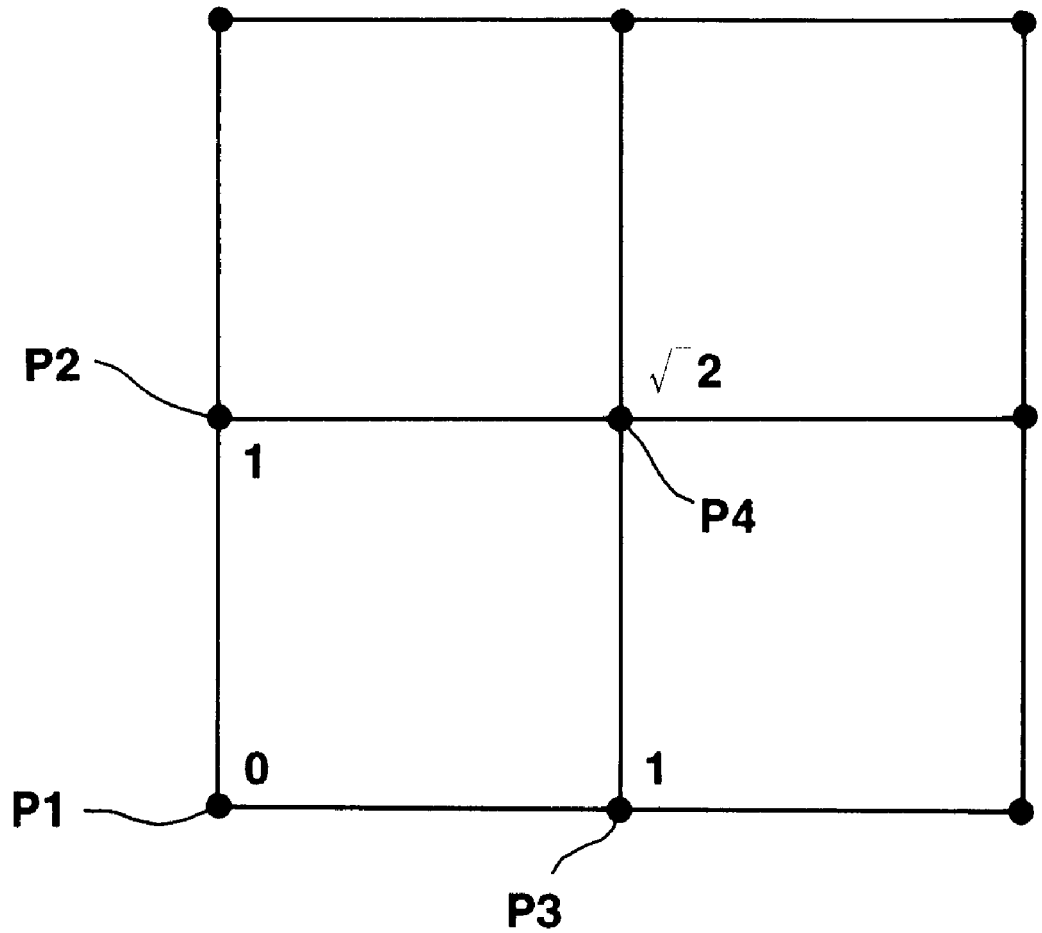
FIG. 21 illustrates the resolution in the above secondary processing.

For finding the comprehensive correction data ΣΔR concerning the saturation degree, the saturation degree of the first source vector $SV_1$ and the saturation degree of the first destination vector $DV_1$ as set by the operator are '$R_{s1}$' and '$R_{D1}$', respectively, as shown in FIG. 20. Thus, the saturation degree ratio between the first source vector $SV_1$ and the destination vector $DV_1$ may be represented by $RD_1/RS_1$.

If, as in computation for the color hue angle, the weighting function as set on the first source vector $SV_1$ is $K_1(\theta)$, the correction data $\Delta R_1$ for the saturation degree for changing the color of the pixel in the vicinity of the first source vector $SV_1$ is given by $$\Delta R_1 = (R_{D1}/R_{S1}) X K_1(\theta) \quad (23)$$

On the other hand, the correction data $\Delta R_1$ to $\Delta R_n$ set in association with the first to n'th source vectors are given by $$\Delta R_1 = (R_{D1}/R_{S1}) X K_1(\theta)$$

$$\Delta R_2 = (R_{D2}/R_{S2}) X K_2(\theta)$$

$$\Delta R_n = (R_{Dn}/R_{Sn}) X K_n(\theta) \quad (24)$$

Thus, by substituting the correction data $\Delta R_1$ to $\Delta R_n$ of the equations (24) into the equation (18), we obtain:

$$\sum \Delta R = (R_{D1}/R_{S1}) \times K_1(\theta) + \quad (25)$$
$$(R_{D2}/R_{S2}) \times K_2(\theta) + \cdots + (R_{Dn}/R_{Sn}) \times K_n(\theta)$$

Based on these equations (22) and (25), the CPU 11 computes the comprehensive correction data ΣΔX, ΣΔY and ΣΔR for each 1° of θ having a value of 0° to 360°. That is, 360 comprehensive correction data ΣΔX, ΣΔY and ΣΔR are computed for all integer angular values. These computed comprehensive correction data ΣΔX, ΣΔY and ΣΔR are stored in the lookup table 62 so as to be addressed for each angle θ.

The comprehensive correction data ΣΔGAIN and ΣΔOFF, stored in the lookup table 63, are explained.

The color correction device of the present invention is configured for setting optional correction gain values $GAIN_1$ to $GAIN_n$ and offset values $OFF_1$ to $OFF_n$ for luminance signals of optional first to n'th source vectors. Thus, the comprehensive correction data, obtained on the basis of the gain values $GAIN_1$ to $GAIN_n$ concerning the luminance signals of the first to n'th source vectors, are defined as ΣΔGAIN, while the comprehensive correction data, obtained on the basis of the offset data $OFF_1$ to $OFF_n$ concerning the luminance signals set for the first to n'th source vectors, are defined as ΣΔOFF.

If the weighting functions K(θ), as previously explained, are taken into account, the correction data $\Delta GAIN_1$ to $\Delta GAIN_n$ concerning the gain of the luminance signals of the first to n'th source vectors are given by:

$$\Delta GAIN_1 = GAIN_1 \times K_1(\theta)$$

$$\Delta GAIN_2 = GAIN_2 \times K_1(\theta)$$

$$\Delta GAIN_n = GAIN_n \times K_1(\theta) \tag{26}$$

Therefore, the comprehensive correction data $\Sigma \Delta GAIN$ concerning the gain of the luminance signals is given by:

$$\sum \Delta GAIN = \Delta GAIN_1 + \Delta GAIN_2 + \cdots + \Delta GAIN_n \tag{27}$$
$$= GAIN_2 \times K_1(\theta) + \cdots + GAIN_n \times K_1(\theta)$$

If similarly the weighting function $K(\theta)$ is taken into account, the correction data $\Delta OFF_1$ to $\Delta OFF_n$ concerning the offset of the luminance signals of the first to n'th source vectors are given by:

$$\Delta OFF_1 = OFF_1 \times K_1(\theta)$$

$$\Delta OFF_2 = OFF_2 \times K_1(\theta)$$

$$\Delta OFF_n = OFF_n \times K_1(\theta) \tag{28}$$

Thus, the comprehensive correction data $\Sigma \Delta OFF$ concerning the offset of the luminance signals is given by:

$$\sum \Delta OFF = \Delta OFF_1 + \Delta OFF_2 + \cdots + \Delta OFF_n \tag{29}$$
$$= OFF_1 \times K_1(\theta) + OFF_2 \times K_1(\theta) +$$
$$\cdots + OFF_n \times K_1(\theta)$$

Based on these equations (27) and (29), the CPU 11 computes the comprehensive correction data $\Sigma \Delta GAIN$ and $\Sigma \Delta OFF$ for each 1° of $\theta$ in a range of from 0° to 360°. That is, 360 comprehensive correction data $\Sigma \Delta GAIN$ and $\Sigma \Delta OFF$ of all integer angular values are produced. The comprehensive correction data $\Sigma \Delta GAIN$ and $\Sigma \Delta OFF$, thus computed, are stored in the lookup table 63 so as to be addressed for each integer angular value $\theta$.

If, in an editing apparatus 100, employing the secondary processor 60 configured as shown in FIG. 19 as the secondary processor 38 of the color correction unit 35 in the picture processing device 30, the menu for condition setting concerning the secondary processing by the secondary processor 60 configured as shown in FIG. 19 as the secondary processor 38 is elected by the operator, the CPU 11 of the computer 10 displays a picture similar to that of FIG. 3B to display still pictures before and after processing by windows W2 and W3. The still pictures after processing is previously processed by the color correction unit 35 by default characteristics and characteristics stored in the memory means responsive to selection by the operator.

If a predetermined color sample is displayed and an operator clicks a mouse 17 on e.g., a still picture prior to processing, the CPU 11 computes the color hue data $\theta_{s1}$ and the saturation degree $R_{D1}$ of the source vector using the color hue and the saturation degree of the clicked pixel. The CPU 11 also displays the source vector selected by the operator and computes color hue data $\theta_{D1}$ and the saturation degree $R_{D1}$ of the destination vector associated with the source vector as in the case of the source vector.

The CPU 11 also accepts, for the source vector, the color hue range $\theta_w$ of the weighting function $K(\theta)$ and the processing gain G of the weighting function $K(\theta)$. By the range W and the gain G of the input object of processing, the CPU 11 generates the weighting function $K_1(\theta)$ of the source vector.

The weighting function $K(\theta)$ is formulated by the shape of an isosceles triangle of a bottom side and a height corresponding to the range W and the gain G of the processing object 1, sliced at a height 1, such that, if the gain G is not larger than 1, the weighting function $K(\theta)$ is represented by the above equations (10) to (12).

The CPU 11 at this time simultaneously accepts the correction value of the luminance level in the source vector. This correction value is represented by the gain $GAIN_1$ and the offset value $OFF_1$.

The CPU 11 is responsive to the actuation by the operator to set desired parameters for the first to n'th source vectors and the destination vectors. That is, if the inputting of all parameters have been entered, the CPU 11 performs the following computational processing on the first to n'th source vectors and the destination vectors.

That is, the CPU 11 computes correction data $\Delta \theta_1$ to $\Delta \theta_n$ and $\Delta R_1$ to $\Delta R_n$ sent to each source vector, based on the above equations (20) to (24), and performs weighting by the weighting function $K_1(\theta)$ corresponding to the computed correction data. Moreover, the CPU 11 computes the comprehensive correction data $\Sigma \Delta \theta$ and $\Sigma \Delta R$.

The CPU 11 sends the comprehensive correction data $\Delta H$ and $\Delta R$ to the picture processing unit controller 31 of the picture processing device 30 for storage in the lookup table 62 of the color correction unit 35.

The CPU 11 similarly weights the correction value $\Delta Y$ for the luminance level, based on the equations (27) and (29), using the weighting functions $K_1(\theta)$, in order to compute the comprehensive correction data $\Sigma \Delta GAIN$ and $\Sigma \Delta OFF$ for each color hue. Thus, the CPU 11 simultaneously corrects the luminance level of the range W of the processing object in order to evade effectively the alien feeling otherwise brought about by changed color hue. For correcting the luminance level at this time, the comprehensive correction data is stored in the lookup table 63 as in the case of the color hue and the saturation degree.

In computing the correction amount, the CPU 11 computes each correction amount by 14 and 11 bits with respect to the color hue $\theta$ and the saturation degree r, while also computing the comprehensive correction data $\Sigma \Delta(\theta)$. The picture signals are digital video signals by the so-called 4:2:2 format and are made up of 10 bits each of the luminance data and the chroma data.

That is, if the 10-bit chroma data by the 4:2:2 format are represented by the chroma plane, since $$\theta_1 = \arctan(511/510)$$
$$= 45.056117°$$
$$\theta_2 = \arctan(511/511)$$
$$= 45.000000°$$

the maximum resolution $\theta_{max}$ is $$\theta_{MAX} = \theta_1 - \theta_2$$
$$= 0.056117°$$

If the resolution of the angle of 0.056117° is difficult to achieve, and the original picture is corrected for color hue, the color hue, which was unfirmly changed in an original picture, is changed stepwise. For procuring the resolution of the angle of 0.056117°, the color hue needs to be represented by 14 bits.

On the other hand, as for the saturation degree r, if, in pixels P1, P2, P3 and P4, consecutive to one another in the horizontal and vertical directions, the saturation degree r is changed sequentially in an oblique direction, this smooth change of the saturation degree r in the oblique direction needs to be maintained in the as-corrected picture. That is, the saturation degree needs to be changed between the pixels P1 and P4 neighboring to each other in the oblique direction in association with the changes in the saturation degree between the pixels P1 and P2 and between the pixels P1 and P3 neighboring to each other in the horizontal and vertical directions.

If the variations in the saturation degree between the pixels P1 and P2 and between the pixels P1 and P3 neighboring to each other in the horizontal and vertical directions are set to 1, since $$1:2^{1/2}=2^{10}:X$$

$$X\approx 1448,$$

the saturation degree r needs to be represented by one bit in contradistinction to chroma data represented by 10 bits.

Thus, the CPU 11 represents the color hue and the saturation degree of the source vector and those of the destination vector by 14 and 11 bits, respectively. Also, the CPU 11 sequentially changes the color hue $\theta$, represented by 14 bits, in order to calculate the correction amount $\Sigma\Delta(\theta)$ for the 14-bit color hue and 11-bit saturation degree. The bit lengths of the weighting function $K(\theta)$ are also correspondingly.

Figure 22:
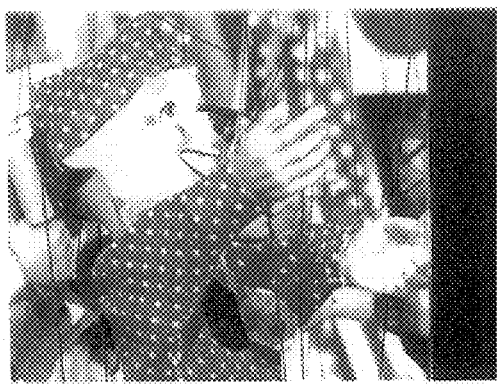
FIG. 22 is a photo showing an example of a source video image processed by the secondary processing unit of FIG. 19 with secondary processing.
Figure 23:
FIG. 23 is a photo showing the results of secondary processing by the secondary processing unit for the source video image shown in FIG. 15 by designating the color hue of 115° (luminance level of 107 gradations) for the source vector and by setting the color hue of 87° for the destination vector, with the saturation degree of 71 for the source video image shown in FIG. 19.
Figure 24:
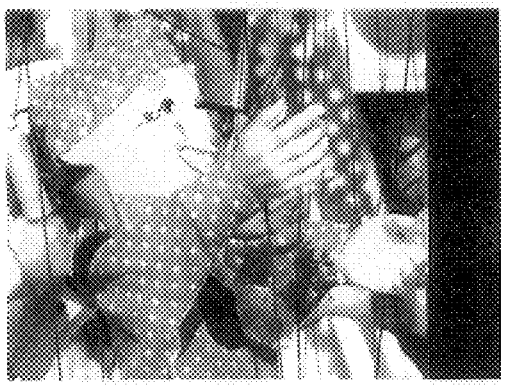
FIG. 24 is a photo showing the results of secondary processing by the secondary processing unit shown in FIG. 19 by setting the color hue of 308° for the destination vector for the source video image shown in FIG. 19.
Figure 25:
FIG. 25 is a photo showing the results of secondary processing by the secondary processing unit shown in FIG. 19 by setting the color hue of 222° for the destination vector for the source video image shown in FIG. 19.

FIG. 23 shows the results of secondary processing by designating the saturation degree of 71 and the color hue 115° (luminance level in 107 gradations) for the source vector for the source video image shown in FIG. 22, by the secondary processor 60 shown in FIG. 19 used as the secondary processor 38 of the color correction unit 35. FIG. 24 shows the results of secondary processing by setting the color hue of 308° as the destination vector. FIG. 25 shows the results of secondary processing by setting the color hue of 222° as the destination vector. As may be seen from FIGS. 22 to 25, it is possible with the present secondary processor 60 to produce practically sufficient processing results, although extremely delicate changes can be noticed from the source video image in the skin color portion proximate to the color hue 115° of the source vector.

Figure 26:
FIG. 26 is a photo showing another example of a source video image processed by the secondary processing unit shown in FIG. 19 with secondary processing.
Figure 27:
FIG. 27 is a photo showing the results of secondary processing by the secondary processing unit shown in FIG. 19 with secondary processing, by designating the red color as the source vector and by setting the green color as the destination vector, for the source video image shown in FIG. 26.
Figure 28:
FIG. 28 is a photo showing the results of secondary processing by the secondary processing unit shown in FIG. 19 with secondary processing, by designating the red color as the source vector, setting the green color as the destination vector and by setting the red color as the destination vector, for the source video image shown in FIG. 26.
Figure 29:
FIG. 29 is a photo showing the results of secondary processing by the secondary processing unit shown in FIG. 19 with secondary processing, by designating the red, green and blue as the source vector, and by setting the green, red and yellow as the destination vector, for the source video image shown in FIG. 26.

FIG. 27 shows the results of secondary processing by the secondary processor 60 by designating the red and the green colors as the source vector and as the destination vector, respectively, for the source video image shown in FIG. 26. Similarly, FIG. 28 shows the results of secondary processing by designating the red and green colors as the source vector and as the destination vector, respectively, and by designating the green and the red colors as the source vector and as the destination vector, respectively, and FIG. 29 shows the results of secondary processing by designating the red, green and blue colors as the source vector and designating the green, red and yellow colors as the destination vector, respectively. As may be seen from FIGS. 26 to 29, it is possible with the present secondary processor 60 to perform secondary processing without affecting the picture quality of the processing results even if the source vector is increased sequentially.

Figure 31:
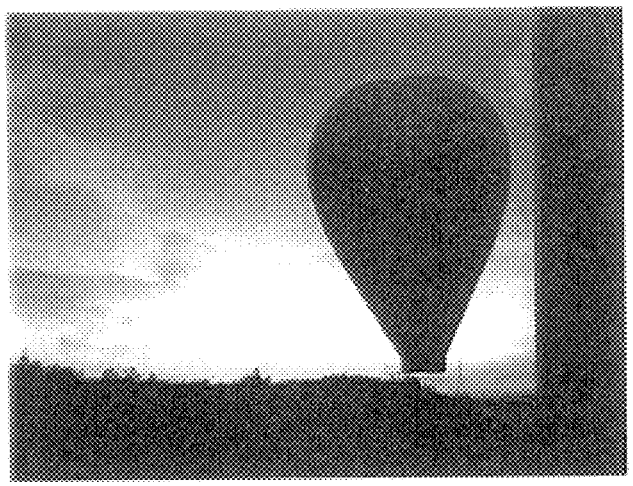
FIG. 31 is a photo showing the results of secondary processing by the secondary processing unit shown in FIG.

Also, FIG. 31 shows the results of secondary processing with emphasis placed on the saturation degree of the blue, yellow and red components, while FIG. 32 shows the results of secondary processing under reduction of the yellow component under the above-described conditions. As may be seen from FIGS. 30 and 31, it is possible with the present secondary processor 60 to process a picture of an evening glow to enhance the difference in brightness in the sky to generate a scene of bright evening glow or a scene directly previous to evening glow.

As the secondary processor 38 of the color correction unit 35 in the picture processing device 30, a color correction unit 70 configured as shown for example in FIG. 33 may be used in place of the color correction unit 60 configured as shown in FIG. 19.

The secondary processor 70 shown in FIG. 33 is made up of a first coordinate conversion circuit 71, first and second lookup tables 72 and 73, first to third multiplication circuits 74 to 76, an addition circuit 77 and a second coordinate conversion circuit 78.

In the secondary processor 70, the first coordinate conversion circuit 71 is fed with chroma data U and V from the primary processing unit 37. The center shaft 37 executes computational processing of the equation (16) on the sequentially entered chroma data U and V to convert the chroma data U and V into data of the color hue $\theta$ and the saturation degree r. This permits the secondary processing unit 70 to represent the sequentially entered picture signals on the color plane in accordance with the polar coordinate system. At this time, the first coordinate conversion circuit 71 generates, from the chroma data U and V, each of 10 bits, 14-bit data of the color hue $\theta$ and 10-bit data of the saturation degree r. This secures sufficient resolution in the next following processing operations. The data of the color hue $\theta$ generated by the first coordinate conversion circuit 71 is sent to the lookup tables 72, 73, while data of the saturation degree r are sent to the first and second multiplication circuits 74, 76.

The first lookup table 72 is formed in advance by storing the correction data $\Delta X$ and $\Delta Y$ computed by the CPU 11 of the computer 10 and outputs the corresponding correction data $\Delta X$ and $\Delta Y$ to the first and second multiplication circuits 74, 76 using the color hue $\theta$ computed by the coordinate conversion circuit 61 as addresses.

The first multiplication circuit 74 multiplies the correction data $\Delta X$ composed of horizontal axis components of the color hue $\theta$ outputted by the lookup table 72 with the saturation degree r computed by the first coordinate conversion circuit 71 to send the result of multiplication to the second coordinate conversion circuit 78. Also, the second multiplication circuit 75 multiplies the correction data $\Delta Y$ composed of the vertical component of the color hue $\theta$ outputted by the first lookup table 72 with the saturation degree r outputted by the first coordinate conversion circuit 71 to send the multiplication output to the second coordinate conversion circuit 78.

The second coordinate conversion circuit 69 converts data referenced to the horizontal and vertical components of the color hue $\theta$ outputted by the first and second coordinate conversion circuits 74, 75 into chroma data U and V, which are outputted.

The second lookup table 73 is formed in advance by storing the comprehensive gain $\Sigma\Delta GAIN$ and $\Sigma\Delta OFF$ of the luminance level associated with each color hue $\theta$ computed by the CPU 11 and outputs the gain $\Sigma\Delta GAIN$ and $\Sigma\Delta OFF$ to the third multiplication circuit 76 and the addition circuit 77 using the color hue $\theta$ outputted by the first coordinate conversion circuit 71 as addresses.

The third multiplication circuit 76 multiplies the luminance data Y sequentially entered from the primary processing unit 37 with the gain $\Sigma\Delta GAIN$ supplied from the second lookup table 73 to send the results of multiplication to the addition circuit 77.

The addition circuit 77 adds the offset ΣΔOFF to output data of the third multiplication circuit 76 to output the resulting sum. The computational processing of the equation (17) is executed in this manner so that the luminance level is corrected by the characteristics as set by the operator for the range W of the processing object.

Specifically, the secondary processor 70 shown in FIG. 33 omits the correction processing for the saturation degree r in the secondary processor 60 configured as shown in FIG. 19 so that the secondary processing is carried out by varying only the color hue θ while maintaining a constant value of the saturation degree r.

That is, with the secondary processor 70, the correction processing for the saturation degree r is omitted so that the setting operation of the first lookup table 72 can be completed in a correspondingly shorter time while simplifying the configuration.

FIG. 35 shows the results of secondary processing obtained on designating the saturation degree of 71 and the color hue of 115° C. (107 gradations of the luminance level) as the source vector and setting the color hue of 87° as the destination vector for the source video image shown in FIG. 34. FIGS. 36 and 37 show the results of secondary processing obtained on setting the color hue of 308° C. and on setting the color hue of 222° C. as the destination vector, respectively. In the secondary processor 70, when the color hue of 308° is set as the destination vector, the skin color portion proximate to the color hue of 308° of the source vector presents the magenta color. However, observation of color hue continuity has indicated that color continuity was better than that with the secondary processor 60 configured as shown in FIG. 19.

The reason the color hue continuity of the as-processed picture is good is presumably that, in the secondary processor 60 configured as shown in FIG. 19, the color hue and the saturation degree are corrected as by interconnecting the source vector and the destination vector on the plane referenced to the color hue, as shown in FIG. 38, whereas, in the secondary processor 70 shown in FIG. 33, the color hue and the saturation degree are corrected as by drawing an arc of a circle between the source vector and the destination vector on the plane referenced to the color hue.

The editing processing operation by this type of the editing apparatus 100 is hereinafter explained.

The CPU 11 of the computer 10 in the editing apparatus 100 secures a work area on a random access memory (RAM) 13 as described above, and is responsive to actuation by the editing operator of the keyboard 16 or the mouse 17 to execute a series of processing sequences stored in the ROM 12 or the hard disc device, not shown, in order to control the operation of the editing apparatus 100. If the start of the editing operation is commanded by the editing operator, the CPU allows an editing processing module (software program) to be started to display a predetermined graphical user interface (GUI) for editing processing on the screen of the monitor device 14.

The editing operation on the editing apparatus 100 is carried out on the editing processing GUI as follows:

First, the CPU 11 displays the time information concerning the material of the editing object on a time line of the GUI. That is, if the editing operator actuates the mouse 17 to select one of plural materials recorded on the hard disc device 20, the time information concerning this material is displayed on the time line of the GUI. It is noted that one of such materials is the material recorded on the hhd 20.

The CPU 11 then decides whether or not an event has been set. That is, the editing operator actuates the mouse 17 to designate the editing start point (in-point) and the editing end point (out-point) for the material displayed on the time line. The result is that an event (occasionally termed a scene) defined by the editing start point and the editing end point is set. Of course, plural events can be set instead of only one event. The CPU 11 decides whether or not an event has been set by this actuation.

The CPU 11 then discriminates whether or not a frame for color correction processing has been selected. That is, the editing operator actuates the mouse 17 or the like to select one of plural scenes displayed on the time line and one frame in the selected scene. By this processing, the CPU 11 decides whether or not a frame for color correction has been selected.

The sequence of event setting and frame selection may be concurrent or reversed from the above sequence.

The CPU 11 then discriminates whether or not the color correction has been designated. That is, the editing operator clicks the color correction button on the GUI to designate the color correction processing. The CPU 11 decides whether or not the color correction processing for the event selected by this actuation has been designated.

When the color correction processing has been designated, the CPU 11 starts the editing processing module to display the pre-set GUI for color correction on the screen of the monitor device 14.

The disc unit controller 21 of the hard disc device 20 is fed with a reproducing command designating reproduction of the frame designated by the CPU 11 to reproduce video data of the frame designated by the hard disc array 22. Also, the picture processing unit controller 31 of the picture processing device 30 is responsive to the control command from the CPU 11 to perform the above-described primary processing on the video data reproduced by the hard disc device 10 by the primary processing unit 37. The video data, thus primary processed, is converted into audio visual interactive (AVI) file form data which is transferred over a local bus BUS to the computer 100.

The CPU 11 causes the primary processed picture to be displayed on the primary video display window on the GUI for color correction by video data of the AVI file form transferred over local bus from the picture processing unit controller 31.

The CPU 11 converts all pixel data of primary processed video data to luminance data Y and chroma data U, V. Specifically, the AVI file form video data transferred over a local bus from the picture processing unit controller 31 are represented by the RGB system. Thus, the CPU 11 converts the data from the RGB system to the YUV system in accordance with the following conversion equation (30):

$$\begin{vmatrix} Y \\ U \\ V \end{vmatrix} = \begin{vmatrix} 0.2988 & 0.5868 & 0.1144 \\ -0.2988 & -0.5868 & 0.8856 \\ 0.7012 & 0.5868 & -0.1144 \end{vmatrix} \begin{vmatrix} R \\ G \\ B \end{vmatrix} \quad (30)$$

The CPU 11 causes the video data, converted into the YUV from, within a vector scope on the GUI for color correction. The vector scope is a scope for displaying distribution on the UV plane by representing data of all supplied pixels, using only chroma data U and V of the YUV system, with one pixel as a light point (display point).

FIG. 40 shows a practical example of a condition setting picture of secondary processing displayed on the screen of the monitor device 14, while FIG. 41 shows its schematic view. This condition setting picture for secondary processing has a picture confirming unit AR1 including a primary video display window and a secondary video display window, a vector scope unit AR2, a vector selection unit AR3 and a system setting unit AR4.

The CPU 11 causes a still picture Primary prior to secondary processing (composed of a still picture processed with primary processing) and a still picture Secondary subsequent to secondary processing in a side-by-side relation on the primary video display window and on the secondary video display window, respectively, of the picture confirming unit AR1 in the condition setting picture of secondary processing. That is, the CPU 11 processes the one-frame still picture designated by the editing operator by the primary processing unit 37 from the editing object designated by the editing start and editing end points as described above to display the still picture as a still picture prior to secondary processing. If the editing operator changes the processing conditions in many ways via this condition setting picture, the CPU 11 is responsive to these conditions to change sequentially the contents of the lookup table of the secondary processor 38 to display the results of secondary processing by these updated contents as a still picture subsequent to primary processing.

In this manner, the editing apparatus 100 can set processing conditions in many ways, as the operator views the processing results, so that the editing apparatus 100 can execute processing of the color correction with a high degree of freedom by a correspondingly simplified operation.

On the picture confirming unit AR1 of the condition setting picture of the secondary processing, display changeover switches FB are arranged on top of the still picture prior to secondary processing and the still picture subsequent to secondary processing. If this button FB is clicked by the mouse, the CPU 11 executes the event registered on the button FB to change over the entire operation to display the still picture prior to secondary processing or the still picture subsequent to secondary processing on a dedicated monitor device. Thus, the processing results can be checked in detail as the occasion may demand to assure processing with correspondingly higher accuracy.

If the editing operator clicks the mouse 17 on the still picture prior to secondary processing displayed on the primary video display window, the CPU 11 acquires the coordinate data of the position clicked by the coordinate data and picture data of the position clicked by these coordinate data from the primary processing unit 37 of the picture processing device 20. The CPU 11 also displays a marker M on the neighboring vector scope unit AR2 responsive to the luminance Y and the color hues U, V of the picture data. The vector scope unit AR2 is a display unit designed to enable visual confirmation of the relation between the color hue of each pixel and the processing range. Thus, the relation between the color hue of a point desired to be changed as the occasion may demand and the processing range and the relation between the color hue of a point desired to be excluded from the change processing range and the processing range can be checked easily and reliably to enable the color correction processing to be executed with a high degree of freedom by a correspondingly simplified operation.

FIG. 42 schematically shows the vector selection unit AR3 and the system setting unit AR4 of the condition setting picture of the secondary processing along with a portion of the vector parameter setting unit AR5. Referring to FIG. 42, the vector selection unit AR3 has ten horizontally arrayed buttons B0 to B9 for selecting the source vector and changeover buttons BL, BR on both sides of the changeover buttons B0 to B9. Next to the right side changeover button BR is arrayed a button B11 used for selecting all source vectors selected in advance. Next to the button B11 is formed a display unit Al used for displaying the number of the selected source vector.

When the CPU 11 displays this condition setting picture, it displays the numbers of the source vectors by the numbers 1 to 10 on the ten buttons B0 to B9. If the changeover buttons BL, BR are clicked by the mouse 17, the events of the changeover buttons BL, BR are executed to scroll sequentially the display of the buttons BL, BR in the direction of display of a triangle indicated on each of the buttons BL, BR.

If one of the buttons B0 to B9 is clicked by the mouse 17, the CPU 11 permits the events registered in the buttons B0 to B9 to be executed to display the numerical figures set on the buttons on the display unit AR1. Moreover, the CPU 11 permits the source vectors of these numerical figures to be displayed on the vector selection unit AR2 and on the vector parameter setting unit AR5 and accepts the actuation of the vector selection unit AR2 and on the vector parameter setting unit AR5 for the source vectors of these numerical figures to accept the inputting of parameters for the source vectors of these numerical figures. Meanwhile, on starting the operation, the CPU 11 allows the source vectors of these numerical figures to be displayed on the vector selection unit AR2 and on the vector parameter setting unit AR5 from the default values and accepts parameter inputting by modification of these default values.

The CPU 11 executes the above computational processing only for the source vectors of the selected numbers to set a lookup table of the secondary processor 38 to update the display on the secondary video display window of the picture confirming unit AR1 based on the set contents. Conversely, if the button B11 for selecting all source vectors is clicked by the mouse 17, the CPU 11 causes the above computational processing to be executed by the parameters set in the selected source vectors among the first to tenth source vectors selected by actuation of the selection/non-selection button B12 arranged in the system setting unit AR4, by parameters set for the selected source vector, to set a lookup table of the secondary processor 38 to update the display of the picture confirming unit AR1 by these set contents.

By this, the editing apparatus 100 sets processing conditions as the processing results of the respective source vectors are checked. In addition, after occasionally selecting the source vectors on actuation of the selection/non-selection button B12, as the occasion may demand, the editing apparatus 100 actuates the button B11 which select all source vectors, in order to check the comprehensive processing results. Therefore, if each source vector is freely set and plural parameters of the plural source vectors are variably set to execute the color corrector processing with a high degree of freedom, the parameters are optionally modified as comprehensive processing results are visually checked to re-select the source vectors to enable desired processing to be executed by a simplified operation.

In the vector parameter setting unit AR5, there is arranged a button B12 constituting the selection/non-selection toggle switch, whereas, in the system setting unit AR4, there is arranged a button OK which command all setting completion. If the selection/non-selection button B12 is clicked by the CPU 11, the selection/non-selection is changed over for the source vector of the numerical figure displayed on the display unit A1, at the same time as a letter Act indicating the selected state is displayed below the button of the source vector associated with the numerical figure (first button B0 in FIG. 42) or the display is discontinued. Also, if the button Ok commanding all setting completion is clicked by the mouse, the CPU 11 executes the above-described computational processing by the parameters set on all selected source vectors to set the lookup table of the secondary processor 38 to complete the display of the condition setting picture. Meanwhile, the system setting unit AR4 has a button 'Cancel' for cancelling the actuation of the button Ok.

FIG. 43 schematically shows the vector parameter setting unit AR5 of the condition setting picture of the secondary processing described above. On actuation of a control bar arranged on the vector parameter setting unit AR5, the CPU 11 accepts parameter setting for the source vector selected via vector selection unit AR3.

On the vector parameter setting unit AR5, a default button B13 is arranged next to the selection/non-selection button B12. On actuation of the button B13, the CPU 11 resets the parameters of the source vector selected by the vector selection unit AR3 to default values. It is noted that the CPU 11 accepts, as parameters of respective source vectors, the color hue, saturation degree and luminance of each source vector, the color hue, saturation degree and luminance of an associated destination vector, range W and gain G of the weighting function K(θ), multiplied values of the luminance level and offset values. For the color hue, saturation degree and luminance of the source vector, among the above parameters, the values set in accordance with the numerical figures of the respective source vectors are set as default values. For the color hue, in particular, the color hue set for the conventional color corrector is set as a default value. In this manner, the present editing apparatus 100 can be actuated without any alien feeling even by an editing operator accustomed to a conventional color corrector.

On the other hand, for the color hue, saturation degree and luminance of the destination vector, the same color hue, saturation degree and the luminance as those of the associated source vectors are set as default values. For the range W and the gain G of the weighting function K(θ), pre-set values are set as default values. The values 1 and 0 are set as multiplied values of the luminance level and as offset values of the luminance level, respectively.

The CPU 11 accepts the setting of parameters from these default values for the respective source vectors to change these values, while switching the display of the picture confirming unit AR1. On actuation of the button B13, the CPU 11 restores the changed parameters to default values, while switching the display of the picture confirming unit AR1.

On the right end of the vector parameter setting unit AR5 are arranged a scroll bar C1 and scroll buttons C2, C3. On actuation of the scroll bar C1 and scroll buttons C2, C3 by the mouse 17, the CPU 11 scrolls the display on the control bar.

Referring to FIG. 43, nine scroll bars are allocated to the vector parameter setting unit 5. The CPU 11 is responsive to actuation of the scroll bar C1 and the scroll buttons C2, C3 to display six of nine control bars on the vector parameter setting unit AR5.

FIG. 44 shows the relation between the control bars and the processing for color correction.

To the upper-stage three of the nine scroll bars are allocated the color hue, (Scr Hue), saturation degree (Scr Sat) and luminance (Scr Lum). If the button 17 arranged in these control bars is grasped by the mouse, the CPU 11 is responsive to mouse actuation to shift the button display in the left-and-right direction. Also, the CPU 11 updates the color hue, saturation degree and luminance of each source vector, responsive to the button positions, to update the values of the color hue, saturation degree and luminance arranged on each button. The CPU 11 also changes over the display on the picture confirming unit AR1 simultaneously with the above processing operations.

To the next three contiguous control bars are allocated the color hue (Dst Hue), saturation degree (Dst Sat) an luminance (Dst Lum) of the destination vector. On actuation of the button arranged on these control bars by the mouse 17, the CPU 11 similarly shifts the button display in the left-and-right direction to update the color hue, saturation degree and luminance of the destination vector to update the values of the color hue, saturation degree and luminance arranged on each button. Simultaneously with these processing operations, the CPU 11 changes over the display on the picture confirming unit AR1.

To the next control bar is allocated the range W (Win) of the weighting function K(θ). If the button arranged on this control bar is grasped and actuated by the mouse 17, the CPU 11 similarly shifts the button display in the left-and-right direction to update the value of the range W of the weighting function K(θ) and the range W arranged on the button. Simultaneously with these processing operations, the CPU 11 again changes over the display on the picture confirming unit AR1.

To the next two control bars are allocated the multiplication value (Mul Lum) and the offset value (Add Lum) of the luminance level. If the button arranged on the control bar is grasped by the mouse and actuated, the CPU 11 similarly shifts the button display in the left-and-right direction to update the multiplication value and offset value of the luminance level. Simultaneously with these processing operations, the CPU 11 again changes over the display on the picture confirming unit AR1.

On the lower side of the vector selection unit AR2 is arranged a control bar acting on the gain G of the weighting function K1(θ). If the buttons arranged on these control bars are grasped and actuated by the mouse, the CPU 11 similarly shifts the button display in the left-and-right direction to update the gain G of the weighting function K(θ). Simultaneously with these processing operations, the CPU 11 again changes over the display on the picture confirming unit AR1.

In the vector parameter setting unit AR5, a display unit A3 of the weighting function K(θ) is formed on the right side of the control bar for the gain G. If the control bar is acted on for the range W and the gain G of the weighting function K(θ) to change the range W and the gain G. Also, if the vector selection unit AR2 as later explained is acted on to change similarly the range W and the gain G, the CPU 11 changes over the display of the display unit A3.

The CPU 11 displays the vertical line VL1 of the center of the weighting function K(θ) by the same color as the cursor display of the source vector in the vector selection unit AR2, while similarly displaying the vertical line VL2 of the falling point of the value of the weighting function K(θ) to zero by the same color as the cursor display of the range W of the weighting function K(θ). The CPU 11 also displays the horizontal line corresponding to the values 1 and 0 of the weighting function K(θ). Thus, with the present embodiment, the range W and the gain G can be grasped visually to enable processing by a simplified operation to a high degree of freedom.

The CPU 11 can also change over the entire operation by the numerical input by the keyboard 16 as in the case these control bars are actuated by the mouse 17 to enable parameters to be set by a variety of actuations as the occasion may demand.

FIG. 46 is a schematic view showing the vector selection unit AR2. In the vector selection unit AR2 is displayed a color distribution display unit D1 specifying the color distribution of the secondary-processed still picture. A color hue ring R1 and a color hue ring R2 specifying the color hue of a color sample are displayed in double display for encircling the color distribution display unit D1.

As indicated by a code F, the CPU 11 displays on the color distribution display unit D1 a monochromatic picture composed of pixels of the still picture distributed on a three-dimensional color space on the UV plane. The CPU 11 also displays the source vector, destination vector and the range W of the weighting function K(θ) on this color distribution display unit D1 while accepting the setting of the parameters via the color distribution display unit D1.

The rgb color specification system and the yuv color specification system, used for displaying the still picture in the picture confirming unit AR1, are represented by:

$$\begin{vmatrix} y \\ u \\ v \end{vmatrix} = \begin{vmatrix} 0.2988 & 0.5868 & 0.1144 \\ -0.2988 & -0.5868 & 0.8856 \\ 0.7012 & 0.5868 & -0.1144 \end{vmatrix} \begin{vmatrix} r \\ g \\ b \end{vmatrix} \quad (31)$$

The colors that can be displayed in this rgb color specification system are limited to those in a rectangular area arrayed with an inclination to the yuv color specification system, as shown in FIG. 47.

If the pixels of the still picture distributed in the three-dimensional color space of the yuv color specification system are projected on the UV plane, the colors of the still picture can be represented by the color hue and the saturation degree devoid of lightness. If specifically the color hue and the saturation degree are represented on the UV plane, these can be represented as shown in FIG. 48, while the black and white colors are represented on a point of origin of intersection of the U and V axes.

If, in the color corrector processing, the color hue is changed responsive to actuation by the editing operator in order to represent color distribution on the UV plane and simultaneously the source vector and the destination vector are displayed, the editing operator can visually grasp the relation between the color desired to be changed and the color not desired to be changed, thus improving operability. As for the overlapped pixels on pixel projection, lightness of the pixels on the uv plane can be set responsive to the number of the overlapped pixels in order to visually grasp the color distribution.

Thus, when displaying the condition setting picture, the CPU 11 executes the processing sequence shown in FIG. 49 to form a basic display picture on the color distribution display unit D1.

That is, in the processing sequence shown in FIG. 49, the area of the picture memory associated with the color distribution display unit D1 is set at step SP1 to black color. At the next step SP2, u and v values are acquired for a pixel of the still picture. The CPU 11 is selectively fed with the picture data U, V outputted by the primary processing unit 37 to acquire the u and v values of the still picture.

At the next step SP3, the luminance level (lightness) for the contents of the picture memory corresponding to the acquired u and v values is increased by a predetermined value, At the next step SP4, it is checked whether or not processing on all pixels has come to a close. If the result is negative, the CPU 11 reverts to step SP2.

Thus, the CPU 11 repeats the processing of the steps SP2 and SP3 to update sequentially the contents of the picture memory corresponding to the color distribution display unit D1 for the pixels making up the still picture in order to project the pixels of the still picture sequentially on the UV plane and in order to set lightness of the projected pixels depending on the number of overlapped pixels. The CPU 11 competes projection for all pixels to display the contents of the picture memory on the color distribution display unit D1. If the affirmative result is obtained at step SP5, the processing sequence is terminated.

The CPU 11 displays the color hue rings R1 and R2 substantially at the same time as it displays the basic picture shown for example in FIG. 46 on the color distribution display unit D1.

It is noted that the color hue rings R1 and R2 are rings displaying the color hue in the color distribution display unit D1 by actual colors, with the outer side ring R2 denoting the state prior to color hue correction. The inner side ring R2 denotes the state before color hue correction. If one of the source vectors is selected in the vector selection unit AR2, the CPU 11 changes the display color of the inner side color hue ring R1 in accordance with the parameters set for the selected source vector.

That is, the CPU 11 is configured to grasp sensually which color should be corrected to which color in order to set parameters by comparison of the outer side color hue ring R2 to the inner side color hue ring R1. In particular, if the editing apparatus 100 can select a large number of source vectors if need be, so that, by comparison of outer side color hue ring R2 to the inner side color hue ring R1, it can grasp sensually which color should be corrected to which color, the processing results can be confirmed visually and correctly, thus improving operability.

Also, if any source vector is selected by the vector selection unit AR2, the CPU 11 allows the selected source vector and the corresponding destination vector to be displayed on the color distribution display unit D1. The CPU 11 also displays a circular marker MSV at the position corresponding to the color hue, saturation degree and luminance as set by the vector parameter setting unit AR5, in order to represent the source vectors. Also, a linear cursor interconnecting the circular marker MSV and the original point is displayed.

The CPU 11 also displays similar circular markers MW1 and MW2, in proximity to the circular marker MSV, with the circular marker MSV as center, in accordance with the width W of the weighting function K(θ) set by the vector parameter setting unit AR5. Also, a linear cursor interconnecting the circular markers MW1 and MW2 with the point of origin is displayed. By comparing the color hue rings R1 and R2 and the markers MSV, MW1 and MW2, the CPU 11 forms the vector selection unit AR2 so that it can be easily and reliably comprehended about which color as center and in which range the color hue is to be corrected. Conversely, by comparing the distribution of colors displayed on the color distribution display unit D1 and the markers MSV to MW2, the CPU 11 forms the vector selection unit AR2 so that it can be easily comprehended in which range of the still picture the color hue is to be corrected.

At this time, the CPU 11 displays the cursor of a straight line interconnecting the markers MSV to MW2 and the point of origin with the same color as that of the cursors VL1 and VL2 at the center and both ends of the weighting function K(θ) on the display unit A3 of the vector parameter setting unit AR5. This allows the CPU 11 to form a display picture such as to permit the relation of correspondence between the vector selection unit AR2 and the display unit A3 to be grasped easily.

Similarly, the CPU 11 displays the destination vector corresponding to this source vector on the color distribution display unit D1. The CPU 11 displays a circular marker MDV at a position corresponding to the color hue, saturation degree and the luminance of the destination vector set by the vector parameter setting unit AR5 in order to represent the destination vector. Moreover, the CPU 11 displays similar circular markers M1, M2 in accordance with the width W of the weighting function K(θ). At this time, the CPU 11 arrays the markers M1 and M2 so that the distance from the point of origin to the markers M1, M2 will be equal to that from the point of origin to the marker MDV.

In this manner, the CPU 11 forms the vector selection unit AR2, by comparison of the color hue rings R1 and R2 and the markers MDV, M1 and M2, so that it can be easily and reliably comprehended to which color should be corrected the color designated by the source vector SV or the like. The CPU also forms the vector selection unit AR2 so that, conversely, by comparing the color distribution displayed on the color distribution display unit D1 and the markers MD to MD2, pixel distribution, for example, in the processing results can be comprehended easily and reliably.

At this time, the CPU 11 interconnects the point of origin and the markers M1 and M2 by a straight line, while interconnecting the markers M1 and M2 by an arc for display, in order to form the vector selection unit AR2 so that it can be sensually comprehended how the saturation degree is varied by correction.

If, in displaying the markers M1 to MDV, the parameters are changed by actuation of the vector parameter setting unit AR5 or on entry on the keyboard, the CPU 11 is responsive to these changes to update the display on the markers M1 to MDV and the display on the color hue ring R1.

Also, if the editing operator clicks the mouse 17 on the still picture prior to secondary processing, the CPU 11 displays the marker M at a position in register with the pixel at the clicked position. This allows the CPU 11 to form the vector selection unit AR2 so that the relation between the color hue of the point to be changed and processed if need be and the processing range and the relation between the color hue of the position to be eliminated by changing and processing and the processing range can be comprehended easily and reliably to enable color corrector processing with a high degree of freedom by a correspondingly simplified operation.

Also, if the markers M1 to MDV concerning the source vector and the destination vector are grasped by the mouse, the CPU 11 is responsive to the movement of the mouse 17 to change the display position of the markers M1 to MDV to modify the display of the color hue ring R2 and the picture confirming unit AR1.

That is, if the marker MSV of the source vector is grasped by the marker MSV of the source vector and the mouse 17 is actuated along a cursor interconnecting the marker MSV and the point of origin, the saturation degree of the source vector is changed as indicated by arrow F1. Similarly, if the mouse 17 is actuated along the color hue ring R1, the color hue by the marker MSV is changed, while the color hue of the source vector is also correspondingly changed, as the relation between the marker and the markers MW1, MW2 is maintained, as shown by arrow F2.

If conversely the markers MW1 or MW2 corresponding to the range W of the weighting function K1(θ) is grasped by the mouse 17, as shown in FIG. 51, the display positions of the markers MW1 and MW2 are changed along the color hue ring R1, with movement of the mouse 17, while the range W also is correspondingly changed. Also, depending on the range W, the positions of the markers M1 or M2 on the destination vector side corresponding to the markers MW1 and MW2 are changed along the color hue ring R1.

If similarly the markers M1 and M2 corresponding to the markers MW1 and MW2 are actuated by the mouse 17 on the destination vector side, the display positions of the markers M1 and M2 are changed for varying the range W of the weighting function K(θ). Simultaneously, the markers MW1 and MW2 on the source vector side are also changed.

If the marker MDV of the destination vector is grasped by the mouse 17 and the mouse 17 is moved along the cursor interconnecting the marker MDV and the point of origin, as shown in FIG. 52, the saturation degree of the destination vector is changed, as indicated by arrow F4. If similarly the mouse 17 is actuated along the color hue ring R1, the color hue by the marker MDV is changed and correspondingly the color hue of the destination vector is changed, while the relation between the marker MDV and the markers M1 and M2 is maintained.

If the source vector of the selected number is held on the default side, or if the source vector is reset to its default value by actuation of the default button B13, the CPU 11 displays the markers MSV to MW2 concerning the source vector in superimposition on the upper side of the display of the markers MDV to M2 concerning the destination vector by the color hue, saturation degree and the luminance of the source vector being set into coincidence with that of the destination vector.

If the display of the color distribution display unit D1 has been formed as described above and the mouse 17 is actuated on the color distribution display unit D1, the relative vertical orientation of the marker display concerning the destination vector and the source vector is cyclically switched responsive to the actuation of the mouse 17. If the mouse 17 is actuated for changing the parameters in the marker display position as described above, the CPU 11 changes e.g., the saturation degree of the upper side marker responsive to the actuation of the mouse 17.

Thus, in the present editing apparatus 100, the color correction processing conditions can be variably set by actuation of the mouse 17 on the color distribution display unit D1 as the operator visually confirms the still picture as the processing object and the processing results on the picture confirming unit AR1.

In doing color correction processing, the editing operator selects at step SP11 in FIG. 53 the condition setting picture and then determines the color for correction and the color after correction from the still picture displayed on the picture confirming unit AR1. Then, processing transfers to step SP12 to select the source vector of the number not as yet selected by the operation of the vector selection unit AR3. Then, processing transfers to step SP13 at which the portion of the original picture in the picture confirming unit AR1 (primary-corrected still picture) desired to be corrected is clicked by the mouse 17. This confirms the position of the color to be corrected by marker display in the color distribution display unit D1 of the vector selection unit AR2.

Then, processing transfers to step SP 14 to set the range W of the weighting function K(θ) and the source vector to surround the marker M. Also, the gain is set by actuation of the vector parameter setting unit AR5. Then, processing transfers to step SP15 to set the destination vector with the color of the target of correction as a target, before processing transfers to step SP16 where it is checked by the picture confirming unit AR1 whether or not the expected processing results have been obtained. If the negative result is obtained, the editing operator performs an operation at step SP17.

If the portion desired to be corrected has not been corrected, the editing operator click the portion desired to be corrected on the mouse 17. Conversely, if the portion not desired to be corrected has also been corrected, the portion superfluously corrected on the original picture is clicked by the mouse 17 in order to confirm the relation with respect to the range of correction by indication of the marker M in the color distribution display unit D1. This again changes the position of the marker concerning the source vector to change the parameters. If conversely the color differs from the desired color, the marker concerning the destination vector, gain G of the weighting function K(θ) or the gain W are changed.

If the gain or the like is finely adjusted in this manner, the editing operator discriminates at step SP16 whether or not the processing results as expected have been achieved. By actuation of the marker in the color distribution display unit D1 or of the button in the vector parameter setting unit AR5, the editing operator repeats the processing sequence of steps SP16 and SP17 to execute desired processing by a simplified operation even if the color of the various original pictures is to be changed with a high degree of freedom. If the expected processing results are obtained, processing transfers from step SP16 to step SP18.

The editing operator then judges whether or not the color correction has come to a close for all desired points. If the negative result is obtained, processing reverts to step SP12. Thus, the editing operator again sets the source vectors or the like and, if setting comes to a close for all desired portions, processing transfers from step SP 18 to step SP19 to terminate the processing sequence.

Thus, the editing apparatus 100 can set the processing conditions variously by a simplified operation to a high degree of freedom.

What is claimed is:

1. A color correction device for correcting colors of plural pixels forming a source video image, comprising:
    parameter setting means for setting plural parameters including a source color hue direction for prescribing a source color range and a destination color hue direction for prescribing a destination color range in a color space;
    computing means for computing correction data for correcting a color contained in said source color range into a color contained in said destination color range; and
    color correction means for correcting an input pixel color having an input color hue angle to a color corresponding to said destination color range based on the correction data if the input pixel color is a color contained in said source color range;
    wherein said color correction means converts the input pixel color to an output color having an output color hue angle at an angular distance from the destination color hue direction, said distance being a function of a distance between the input color hue angle and the source color hue direction, said output color hue angle also being at a distance from the input pixel color hue angle that is an inverse function of the distance between the input color hue angle and the source color hue direction.

2. The color correction device according to claim 1, wherein a color hue direction of said source color range is defined by a source vector on the color space and wherein a color hue direction of said destination color range is defined by a destination vector on the color space.

3. The color correction device according to claim 1, wherein said parameter setting means comprises:
    means for setting at least parameters for a source color hue range, and a source saturation degree, for prescribing the source color range; and
    means for setting a destination saturation degree for prescribing the destination color range.

4. The color correction device according to claim 3, wherein:
    said parameter setting means further comprises gain setting means for setting parameters for a gain value of said correction data;
    said computing means computes said correction data using parameters for the source color hue direction, source color hue range, source saturation degree, destination color hue direction, destination saturation degree, and gain value as set by said parameter setting means.

5. The color correction device according to claim 4, wherein said gain setting means sets said gain value as a function of a proximity of a computed color hue angle to a color hue direction of a color hue range.

6. The color correction device according to claim 3, wherein said computing means computes said correction data from one color hue to another as a function of a proximity of a computed color hue angle to a color hue direction of a color hue range.

7. A color correction device for correcting colors of plural pixels forming a source video image, comprising:
    parameter setting means for setting parameters of at least a source color hue direction, a source color hue range, and a source saturation degree for prescribing a source color range, and for setting parameters of at least a destination color hue direction and a destination saturation degree for prescribing a destination color range in a color space;
    computing means for computing correction data for correcting a color contained in said source color range into a color contained in said destination color range; and
    color correction means for correcting an input pixel color having an input color hue angle to a color corresponding to said destination color range based on the correction data if the input pixel color is a color contained in said source color range;
    wherein said color correction means converts the input pixel color to an output color having an output color hue angle with a proximity to the destination color hue direction, said proximity being a function of a proximity of the input color hue angle to the source color hue direction, said output color hue angle also having a proximity to the input pixel color hue angle that is an inverse function of the proximity of the input color hue angle to the source color hue direction.

8. The color correction device according to claim 3, wherein said computing means computes said correction data using a source algorithm for correcting the color of the pixel corresponding to said source color range to the color corresponding to said destination color range while maintaining the source saturation degree constant.

9. The color correction device according to claim 3, wherein said computing means computes said correction data using a destination algorithm for correcting the color of the pixel corresponding to said source color range to the color corresponding to said destination color range while varying the source saturation degree.

10. The color correction device according to claim 3, comprising:
    a computer including said parameter setting means and said computing means; and
    a picture processing unit including said color correction means.

11. The color correction device according to claim 10, wherein said computer is programmed for displaying on a computer monitor a graphical interface comprising:

a parameter setting window for interactively setting parameters for said source color hue direction, source color hue range, source saturation degree, destination color hue direction, and destination saturation degree; and a view window for displaying a video image prior to color correction by said color correction means and a video image subsequent to said color correction.

12. A color correction method for correcting colors of plural pixels making up a source video image, comprising:

setting a plurality of parameters including a source color hue direction for prescribing a source color range and a destination color hue direction for prescribing a destination color range in a color space;

computing correction data for correcting colors contained in said source color range to colors contained in said destination color range; and correcting an input pixel color having an input color hue angle to an output color corresponding to the destination color range, based on the correction data, if the input pixel color is a color contained in said source color range, said output color having an output color hue angle at an angular distance from the destination color hue direction, said distance being a function of a distance between the input color hue angle and the source color hue direction, and said output color hue angle also being at a distance from the input pixel color hue angle that is an inverse function of the distance between the input color hue angle and the source color hue direction.

13. The color correction method according to claim 12, wherein:

at least parameters for at least a source color hue direction, a source color hue range, and a source saturation degree are set as said plural parameters for prescribing said source color range; and parameters for at least a destination color hue direction and a destination saturation degree are set as said plural parameters for prescribing said destination color range.

14. The color correction method according to claim 13, further comprising the step of setting parameters for a gain value of said correction data; and wherein said correction data are computed using parameters for the source color hue direction, source color hue range, source saturation degree, destination color hue direction, and destination saturation degree, and also using parameters for said gain.

15. The color correction method according to claim 14, wherein the gain is set as a function of a proximity of a computed color hue angle to the color hue direction of said color hue range.

16. The color correction method according to claim 13, wherein the correction data is computed from one color hue angle to another as a function of a proximity of a color hue angle to said color hue direction of said color hue range.

17. The color correction method according to claim 13, wherein said correction data is computed using a source algorithm for correcting the pixel color corresponding to said source color range to a color corresponding to the destination color range while maintaining said source saturation degree constant.

18. The color correction method according to claim 13, wherein said correction data is computed using a destination algorithm for correcting the pixel color corresponding to said source color range to a color corresponding to the destination color range while varying said source saturation degree.

19. A color correction device for correcting plural pixel colors forming a source video image, comprising:

parameter setting means for setting parameters for first to N'th destination vectors individually associated with first to N'th source vectors;

computing means for computing comprehensive correction data based on plural correction data for correcting colors represented by the source vectors to colors represented by the corresponding destination vectors; and color correction means for correcting a pixel color to a color of a destination vector associated with a source vector, based on said comprehensive correction data, if the pixel color of said source video image is a color represented by one of the first to N'th source vectors;

said parameter setting means comprising means for setting parameters for a first to an N'th color hue window for specifying a color hue range for the source vector and parameters for gain values of the correction data in association with the first to N'th source vectors;

wherein, a proximity of the destination vector to a color hue angle of a color to which the pixel color is converted is a function of a proximity of a color hue angle of the pixel to said source vector; and a proximity of the pixel color hue angle to the color hue angle of the color to which the pixel color is converted is an inverse function of the proximity of the color hue angle of the pixel to the source vector.

20. The color correction device according to claim 19, wherein said correction data is computed using an algorithm for correcting the pixel color corresponding to a first color range to a color corresponding to a second color range while maintaining a source saturation degree constant.

21. The color correction device according to claim 19, wherein said correction data is computed using an algorithm for correcting the pixel color corresponding to a first color range to a color corresponding to a second color range while varying a source saturation degree.

22. The color correction device according to claim 19, comprising:

a computer including said parameter setting means and said computing means; and a picture processing unit including said color correction means.

23. The color correction device according to claim 22, wherein said computer is programmed for displaying on a computer monitor a graphical interface comprising:

a parameter setting window for interactively setting parameters for the color hue range of said source vector and said destination vector; and a view window for displaying a video image prior to color correction by said color correction means and a video image subsequent to color correction.

24. A color correction method for correcting the colors of plural pixels forming a source video image, comprising:

setting parameters for first to N'th destination vectors individually associated with first to N'th source vectors;

computing comprehensive correction data based on plural correction data for correcting colors represented by the source vectors to colors represented by the corresponding destination vectors;

setting parameters for a first to an N'th color hue window for specifying a color hue range of the source vector and parameters for a gain value of the first to N'th correction data in association with the first to N'th source vectors;

correcting a pixel color to a color of a destination vector, based on said comprehensive correction data, if the pixel color forming said source video image is a color represented by one of the first to N'th source vectors;

wherein,
- a proximity of the destination vector to a color hue angle of a color to which the pixel color is converted is a function of a proximity of a color hue angle of the pixel to said source vector; and
- a proximity of the pixel color hue angle to the color hue angle of the color to which the pixel color is converted is an inverse function of a proximity of the color hue angle of the pixel to the source vector.

25. The color correction device according to claim 24, wherein said correction data is computed using an algorithm for correcting the pixel color corresponding to a first color range to a color corresponding to a second color range while maintaining a source saturation degree constant.

26. The color correction device according to claim 24, wherein said correction data is computed using an algorithm for correcting the pixel color corresponding to a first color range to a color corresponding to a second color range while varying a source saturation degree.

27. A color correction device for correcting plural pixel colors constituting a source video image, comprising:

vector designating means for designating plural destination vectors individually associated with plural source vectors in a color space;

computing means for computing comprehensive correction data for correcting colors represented by said plural source vectors to colors represented individually by said plural destination vectors; and color correction means for correcting a color of a pixel constituting said source video image to a color of a destination vector associated with a source vector, based on the comprehensive correction data, if the color of the pixel is a color represented by any of the plural source vectors;

wherein said color correction means converts an input pixel color having an input color hue angle to an output color having an output color hue angle at an angular distance from a destination vector, said distance being a function of an angular distance between the input color hue angle and an associated source vector, said output color hue angle also being at a distance from the input pixel color hue angle that is an inverse function of the distance of the input color hue angle to the associated source vector.

* * * * *